(12) United States Patent
Imaoka et al.

(10) Patent No.: US 8,611,016 B2
(45) Date of Patent: Dec. 17, 2013

(54) ZOOM LENS SYSTEM, INTERCHANGEABLE LENS APPARATUS AND CAMERA SYSTEM

(75) Inventors: Takuya Imaoka, Kanagawa (JP); Kyoichi Miyazaki, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 488 days.

(21) Appl. No.: 13/049,898

(22) Filed: Mar. 17, 2011

(65) Prior Publication Data

US 2011/0228160 A1   Sep. 22, 2011

(30) Foreign Application Priority Data

Mar. 19, 2010   (JP) .................. 2010-065052

(51) Int. Cl.
  *G02B 15/14*   (2006.01)
  *G02B 27/64*   (2006.01)

(52) U.S. Cl.
  USPC ........... 359/684; 359/683; 359/685; 359/686; 359/687; 359/689; 359/690; 359/691; 359/692; 359/708; 359/713; 359/714; 359/715; 359/716; 359/717; 359/740; 359/557

(58) Field of Classification Search
  USPC .......... 359/683–692, 713–717, 708, 740, 557
  See application file for complete search history.

(56) References Cited

U.S. PATENT DOCUMENTS

| | | | | |
|---|---|---|---|---|
| 5,202,992 A | * | 4/1993 | Banno et al. | 359/676 |
| 2010/0091172 A1 | * | 4/2010 | Miyazaki et al. | 359/684 |
| 2010/0091174 A1 | * | 4/2010 | Miyazaki et al. | 359/684 |

FOREIGN PATENT DOCUMENTS

| | | |
|---|---|---|
| JP | H11-072705 A | 3/1999 |
| JP | 2004-341060 A | 12/2004 |
| JP | 2005-141056 A | 6/2005 |
| JP | 2005-215518 A1 | 8/2005 |
| JP | 2008-032924 A1 | 2/2008 |
| JP | 2009-163271 A | 7/2009 |
| JP | 2009-169051 A | 7/2009 |

* cited by examiner

*Primary Examiner* — Evelyn A. Lester
(74) *Attorney, Agent, or Firm* — Judge Patent Associates

(57) ABSTRACT

A zoom lens system comprising a plurality of movable lens units which individually move along an optical axis at the time of zooming from a wide-angle limit to a telephoto limit during image taking, wherein at least two of the movable lens units are focusing lens units which move along the optical axis at the time of focusing from an infinity in-focus condition to a close-object in-focus condition in at least one zooming position, and among the focusing lens units, a lens unit having the absolute value, which is not the greatest absolute value, of a wobbling value at a wide-angle limit is a wobbling lens unit which senses a moving direction of the focusing lens units at the time of focusing by wobbling itself in a direction along the optical axis; an interchangeable lens apparatus; and a camera system are provided.

12 Claims, 25 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-065052 filed in Japan on Mar. 19, 2010, the contents of which are hereby incorporated by reference.

BACKGROUND OF THE INVENTION

1. Field of the Invention

The present invention relates to a zoom lens system, an interchangeable lens apparatus, and a camera system. In particular, the present invention relates to: a compact and lightweight zoom lens system having a relatively high zooming ratio, in which aberration fluctuation in association with focusing is reduced, aberrations particularly in a close-object in-focus condition are sufficiently compensated to provide excellent optical performance over the overall focusing condition, and continuous high-speed autofocusing performance extremely being suitable for image taking of videos is provided; and an interchangeable lens apparatus and a camera system each employing this zoom lens system.

2. Description of the Background Art

In recent years, interchangeable-lens type digital camera systems (also referred to simply as "camera systems", hereinafter) have been spreading rapidly. Such interchangeable-lens type digital camera systems can realize: taking of a high-sensitive and high-quality image; high-speed focusing and high-speed image processing after image taking; and easy replacement of an interchangeable lens apparatus in accordance with a desired scene. Furthermore, an interchangeable lens apparatus having a zoom lens system that forms an optical image with variable magnification is popular because it allows free change of focal length without the necessity of lens replacement.

A compact zoom lens system having a high zooming ratio and excellent optical performance from a wide-angle limit to a telephoto limit has been desired as a zoom lens system to be used in an interchangeable lens apparatus. Various kinds of zoom lens systems having multiple-unit configurations, such as four-unit configuration and five-unit configuration, have been proposed. In such zoom lens systems, focusing is usually performed such that some lens units in the lens system are moved in a direction along the optical axis. However, when focusing from an infinity in-focus condition to a close-object in-focus condition is performed by a single lens unit, the amount of movement at focusing of this lens unit depends on paraxial power configuration in the entire lens system. Therefore, it is difficult to favorably compensate the amount of aberration fluctuation from a wide angle limit to a telephoto limit.

In order to reduce aberration fluctuation at the time of focusing, various zoom lens systems are proposed, in which a plurality of lens units in the lens system are individually moved in the direction along the optical axis.

Japanese Patent No. 4402368 discloses a zoom lens having four-unit configuration of positive, negative, negative, and positive. In this zoom lens, at the time of zooming, a first lens unit and a fourth lens unit move from the image side to the object side, and thereby the intervals between the respective lens units are changed. At the time of focusing, a second lens unit moves to the image side at a wide-angle limit and moves to the object side at a telephoto limit, and a third lens unit moves to the object side regardless of the zooming condition. The amounts of movement at the time of focusing of the second and third lens units are set forth.

Japanese Laid-Open Patent Publication No. 2009-169051 discloses a zoom lens having three-or-more-unit configuration, in which a negative lens unit is located closest to the object side. In this zoom lens, the intervals between the respective lens units are changed at the time of zooming. A first focusing unit and a second focusing unit which includes a positive lens and a negative lens individually move at the timing of focusing. Abbe numbers of the positive lens and the negative lens are set forth.

Japanese Laid-Open Patent Publication No. 11-072705 discloses a zoom lens having a six-unit configuration of positive, negative, positive, positive, negative, and positive. In this zoom lens, at the time of zooming, at least one magnification-variable lens unit among the second to sixth lens units moves along the optical axis. At least one of the third to sixth lens units is moved along the optical axis to compensate variation in the image point position due to the zooming. At least two focusing lens units among the first to sixth lens units are moved along the optical axis to perform focusing.

In each of the zoom lenses disclosed in the above-described patent literatures, the aberration fluctuation at the time of focusing is reduced to some extent. However, since compensation of aberrations, particularly in a close-object in-focus condition, is insufficient, the zoom lenses do not have excellent optical performance over the entire object distance from an infinite object distance to a close object distance.

In recent years, among the camera systems, particularly a video camera system for image taking of videos is strongly desired, and a zoom lens system which is able to continuous high-speed autofocus is needed. However, the zoom lenses disclosed in the above-described patent literatures do not have continuous high-speed autofocusing performance being applicable for such the video camera system.

SUMMARY OF THE INVENTION

An object of the present invention is to provide: a compact and lightweight zoom lens system having a relatively high zooming ratio, in which aberration fluctuation in association with focusing is reduced, aberrations particularly in a close-object in-focus condition are sufficiently compensated to provide excellent optical performance over the overall focusing condition, and continuous high-speed autofocusing performance extremely being suitable for image taking of videos is provided; and an interchangeable lens apparatus and a camera system each employing this zoom lens system.

The novel concepts disclosed herein were achieved in order to solve the foregoing problems in the conventional art, and herein is disclosed:

a zoom lens system comprising a plurality of lens units, each lens unit comprising at least one lens element, wherein the plurality of lens units include a plurality of movable lens units which individually move along an optical axis at the time of zooming from a wide-angle limit to a telephoto limit during image taking, at least two of the movable lens units are focusing lens units which move along the optical axis at the time of focusing from an infinity in-focus condition to a close-object in-focus condition in at least one zooming position from a wide-angle limit to a telephoto limit, and among the focusing lens units, a lens unit having the absolute value, which is not the greatest absolute value, of a wobbling value at a wide-angle limit represented by the following expression (a) is a wobbling lens unit which senses a moving direction of the focusing lens units at the time of focusing by wobbling itself in a direction along the optical axis:

$$W = 1/e + \beta_{WO}/(Sb \times f_{WO}) - 1/((\beta_R \times f_R)) \quad (a)$$

where
W is a wobbling value at a wide-angle limit (wobbling incremental magnification sensitivity),
Sb is a focus sensitivity of the wobbling lens unit represented by the following expression $$Sb = (1 - \beta_{WO}^2) \times \beta_R^2,$$

e is an exit pupil position of the entire system at a wide-angle limit,
$\beta_{WO}$ is a paraxial lateral magnification of the wobbling lens unit at a wide-angle limit in an infinity in-focus condition,
$f_{WO}$ is a focal length of the wobbling lens unit at a wide-angle limit in an infinity in-focus condition,
$\beta_R$ is a paraxial lateral magnification of a system on the image side relative to the wobbling lens unit at a wide-angle limit in an infinity in-focus condition, and
$f_R$ is a focal length of a system on the image side relative to the wobbling lens unit at a wide-angle limit in an infinity in-focus condition.

The novel concepts disclosed herein were achieved in order to solve the foregoing problems in the conventional art, and herein is disclosed:
an interchangeable lens apparatus comprising:
a zoom lens system; and
a lens mount section which is connectable to a camera body including an image sensor for receiving an optical image formed by the zoom lens system and converting the optical image into an electric image signal; wherein
the zoom lens system comprises a plurality of lens units, each lens unit comprising at least one lens element, in which
the plurality of lens units include a plurality of movable lens units which individually move along an optical axis at the time of zooming from a wide-angle limit to a telephoto limit during image taking,
at least two of the movable lens units are focusing lens units which move along the optical axis at the time of focusing from an infinity in-focus condition to a close-object in-focus condition in at least one zooming position from a wide-angle limit to a telephoto limit, and
among the focusing lens units, a lens unit having the absolute value, which is not the greatest absolute value, of a wobbling value at a wide-angle limit represented by the following expression (a) is a wobbling lens unit which senses a moving direction of the focusing lens units at the time of focusing by wobbling itself in a direction along the optical axis:

$$W = 1/e + \beta_{WO}/(Sb \times f_{WO}) - 1/((\beta_R \times f_R)) \quad (a)$$

where
W is a wobbling value at a wide-angle limit (wobbling incremental magnification sensitivity),
Sb is a focus sensitivity of the wobbling lens unit represented by the following expression $$Sb = (1 - \beta_{WO}^2) \times \beta_R^2,$$

e is an exit pupil position of the entire system at a wide-angle limit,
$\beta_{WO}$ is a paraxial lateral magnification of the wobbling lens unit at a wide-angle limit in an infinity in-focus condition,
$f_{WO}$ is a focal length of the wobbling lens unit at a wide-angle limit in an infinity in-focus condition,
$\beta_R$ is a paraxial lateral magnification of a system on the image side relative to the wobbling lens unit at a wide-angle limit in an infinity in-focus condition, and
$f_R$ is a focal length of a system on the image side relative to the wobbling lens unit at a wide-angle limit in an infinity in-focus condition.

The novel concepts disclosed herein were achieved in order to solve the foregoing problems in the conventional art, and herein is disclosed:
a camera system comprising:
an interchangeable lens apparatus including a zoom lens system; and
a camera body which is detachably connected to the interchangeable lens apparatus via a camera mount section, and includes an image sensor for receiving an optical image formed by the zoom lens system and converting the optical image into an electric image signal; wherein
the zoom lens system comprises a plurality of lens units, each lens unit comprising at least one lens element, in which
the plurality of lens units include a plurality of movable lens units which individually move along an optical axis at the time of zooming from a wide-angle limit to a telephoto limit during image taking,
at least two of the movable lens units are focusing lens units which move along the optical axis at the time of focusing from an infinity in-focus condition to a close-object in-focus condition in at least one zooming position from a wide-angle limit to a telephoto limit, and
among the focusing lens units, a lens unit having the absolute value, which is not the greatest absolute value, of a wobbling value at a wide-angle limit represented by the following expression (a) is a wobbling lens unit which senses a moving direction of the focusing lens units at the time of focusing by wobbling itself in a direction along the optical axis:

$$W = 1/e + \beta_{WO}/(Sb \times f_{WO}) - 1/((\beta_R \times f_R)) \quad (a)$$

where
W is a wobbling value at a wide-angle limit (wobbling incremental magnification sensitivity),
Sb is a focus sensitivity of the wobbling lens unit represented by the following expression $$Sb = (1 - \beta_{WO}^2) \times \beta_R^2,$$

e is an exit pupil position of the entire system at a wide-angle limit,
$\beta_{WO}$ is a paraxial lateral magnification of the wobbling lens unit at a wide-angle limit in an infinity in-focus condition,
$f_{WO}$ is a focal length of the wobbling lens unit at a wide-angle limit in an infinity in-focus condition,
$\beta_R$ is a paraxial lateral magnification of a system on the image side relative to the wobbling lens unit at a wide-angle limit in an infinity in-focus condition, and
$f_R$ is a focal length of a system on the image side relative to the wobbling lens unit at a wide-angle limit in an infinity in-focus condition.

According to the present invention, it is possible to provide: a compact and lightweight zoom lens system having a relatively high zooming ratio, in which aberration fluctuation in association with focusing is reduced, aberrations particularly in a close-object in-focus condition are sufficiently compensated to provide excellent optical performance over the overall focusing condition, and variation in image taking magnification due to wobbling is suppressed in spite of continuous high-speed autofocusing performance extremely being suitable for image taking of videos; and an interchangeable lens apparatus and a camera system each employing this zoom lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Embodiments 1 to 6

FIGS. 1, 5, 9, 13, 17, and 21 are lens arrangement diagrams of zoom lens systems according to Embodiments 1 to 6, respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit, in order from the top. In the part between the wide-angle limit and the middle position, and the part between the middle position and the telephoto limit, the positions are connected simply with a straight line, and hence this line does not indicate actual motion of each lens unit.

Figure 9:
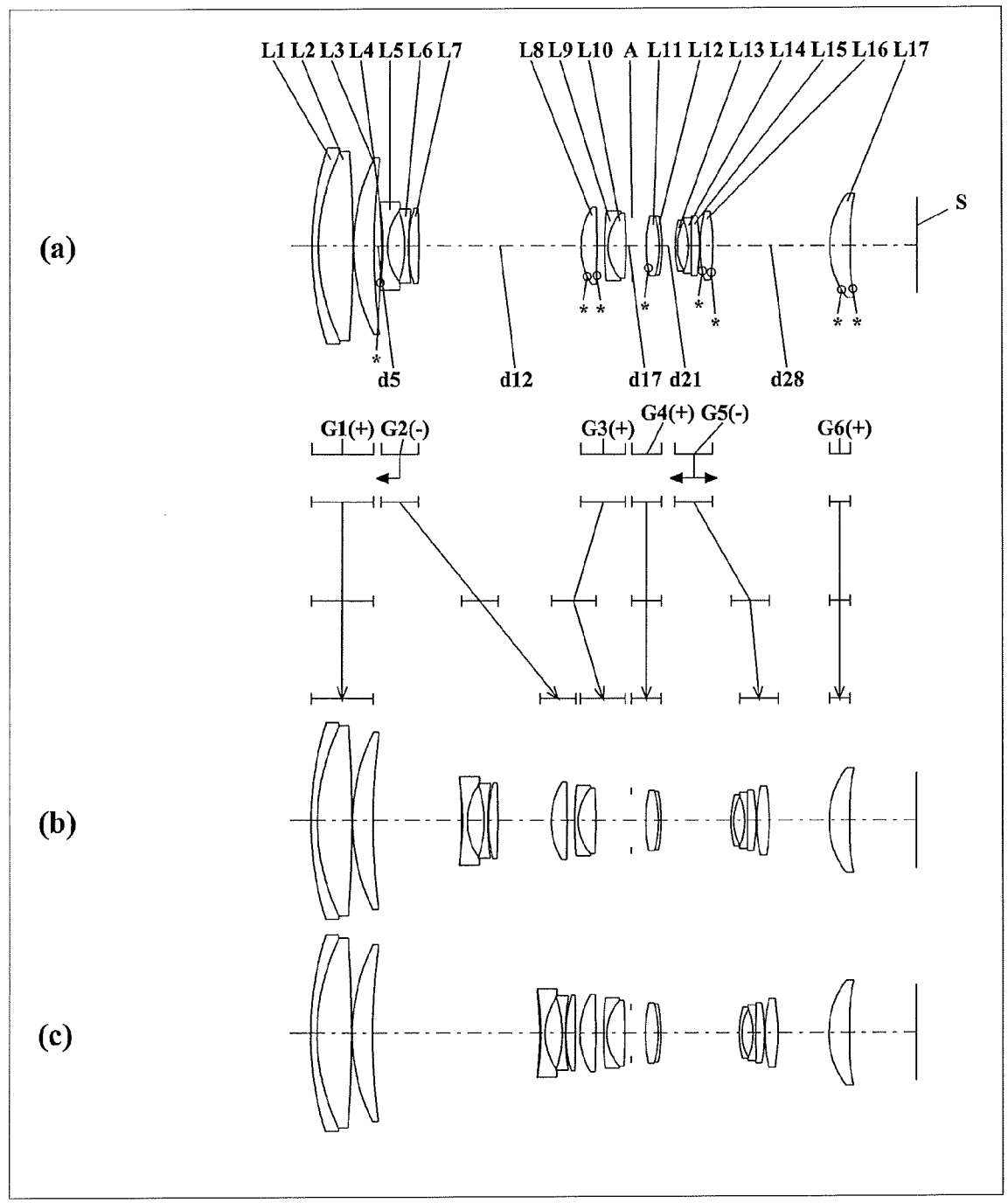
FIG. 9 is a lens arrangement diagram showing an infinity in-focus condition of a zoom lens system according to Embodiment 3 (Example 3)
Figure 10:
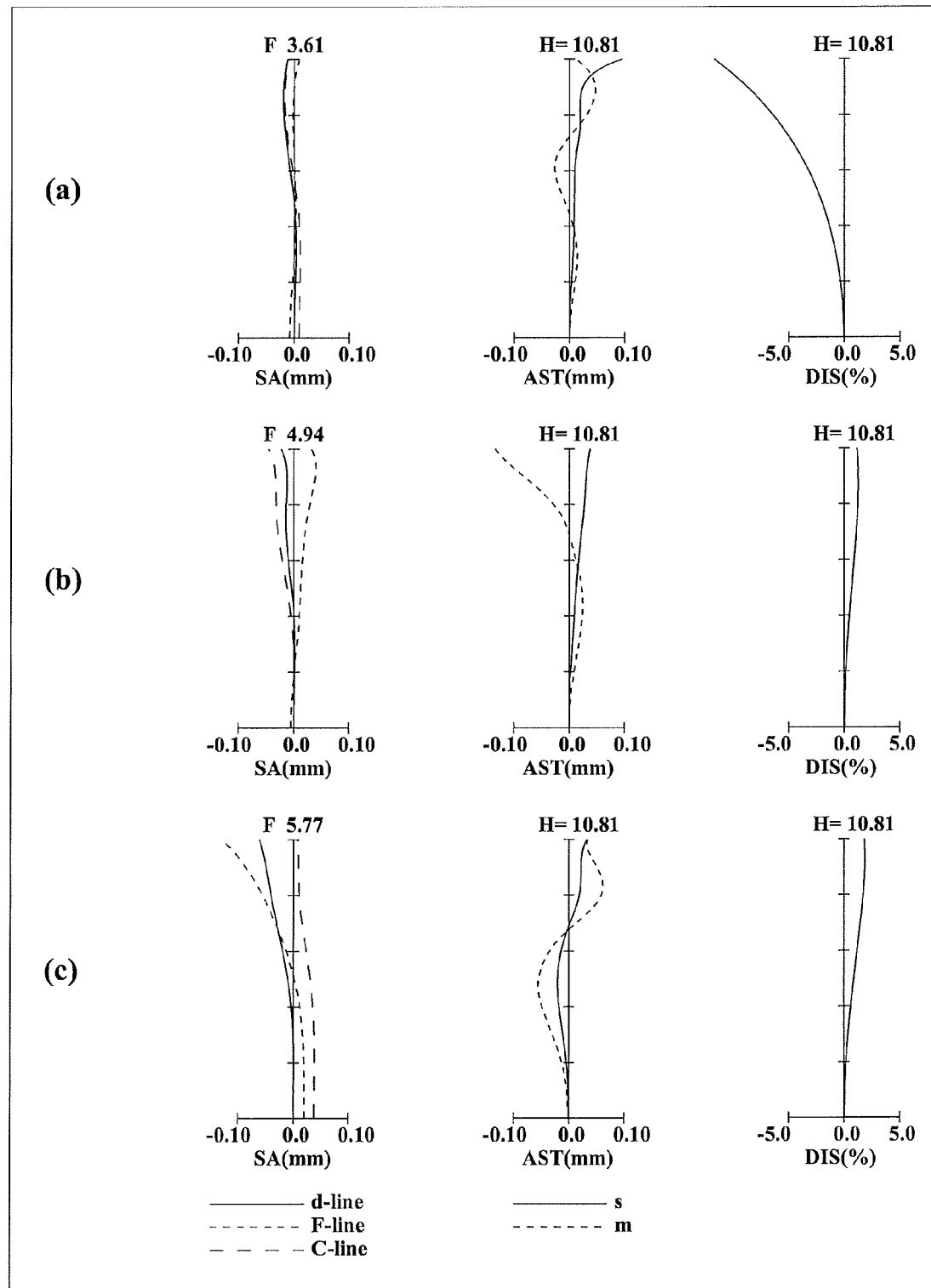
FIG. 10 is a longitudinal aberration diagram showing an infinity in-focus condition of a zoom lens system according to Example 3.
Figure 11:
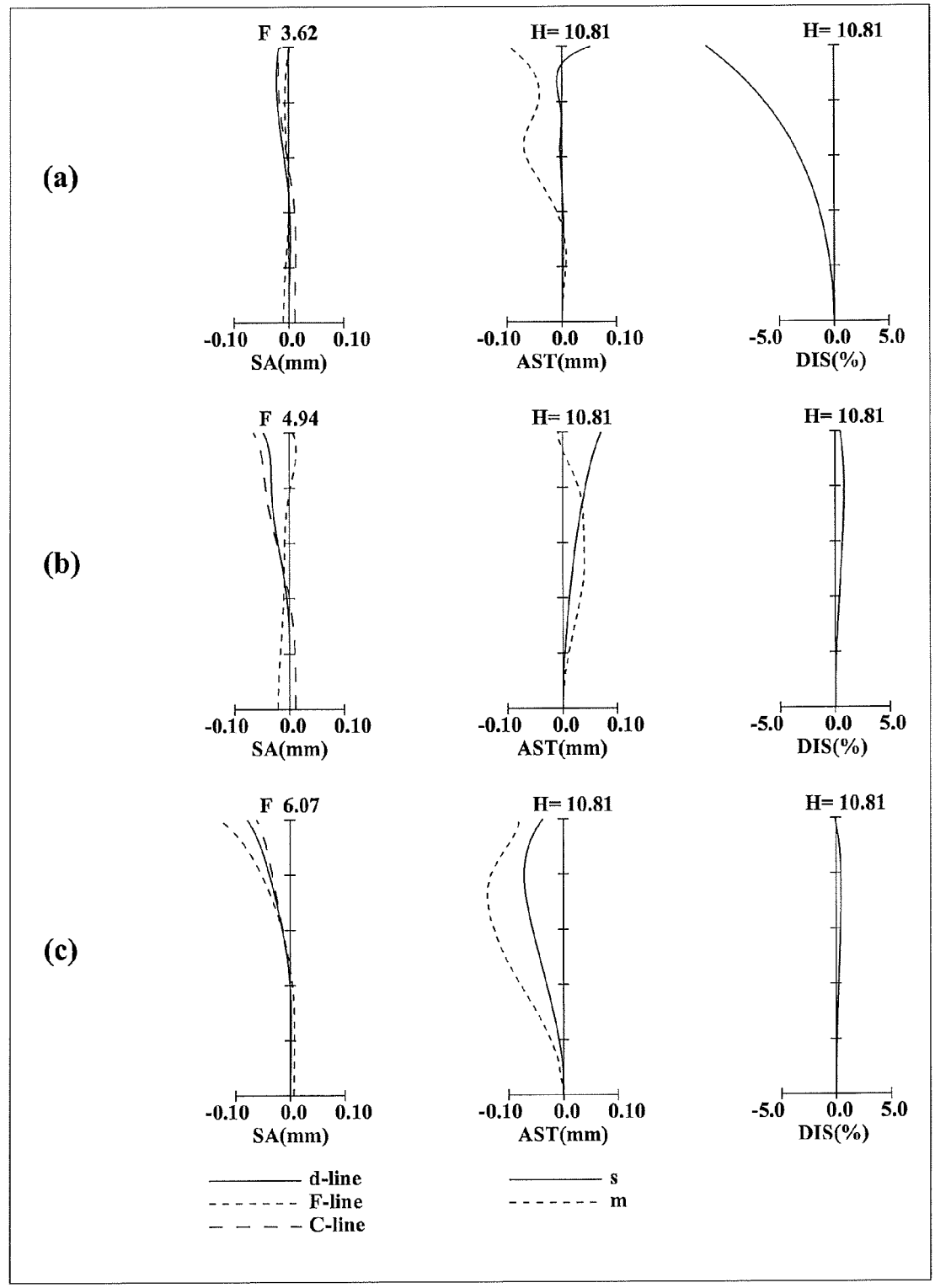
FIG. 11 is a longitudinal aberration diagram of a close-object in-focus condition of a zoom lens system according to Example 3.
Figure 12:
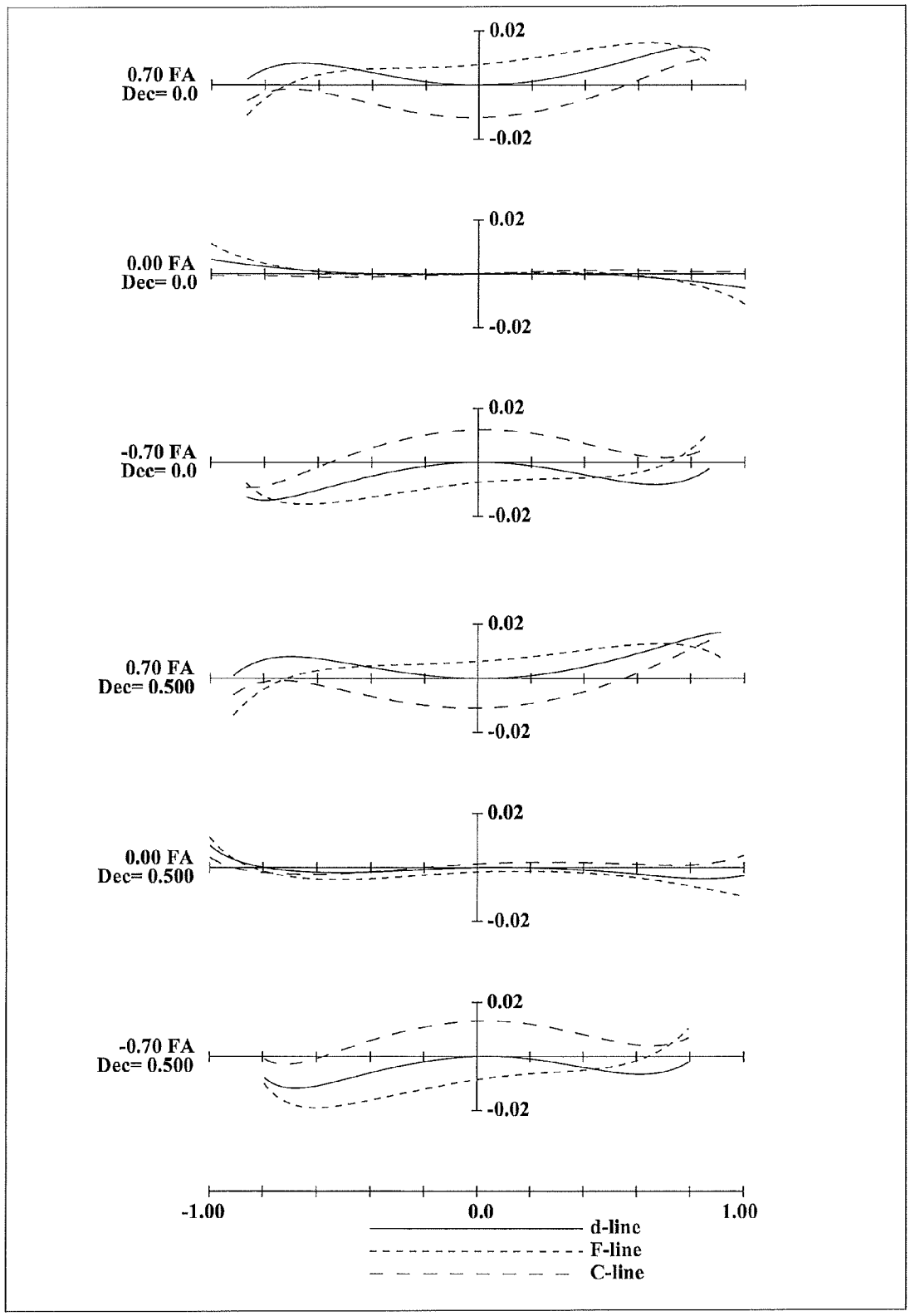
FIG. 12 is a lateral aberration diagram of a zoom lens system according to Example 3 at a telephoto limit in a basic state where image blur compensation is not performed and in an image blur compensation state.
Figure 13:
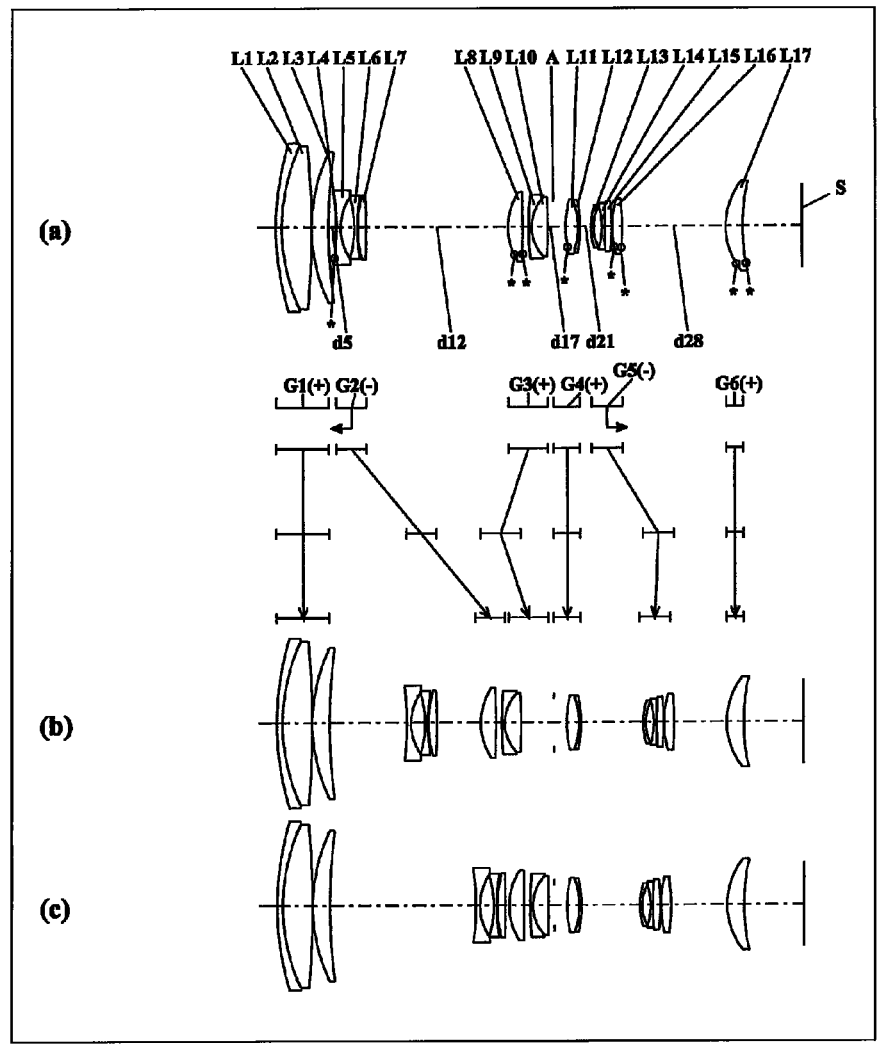
FIG. 13 is a lens arrangement diagram showing an infinity in-focus condition of a zoom lens system according to Embodiment 4 (Example 4)
Figure 14:
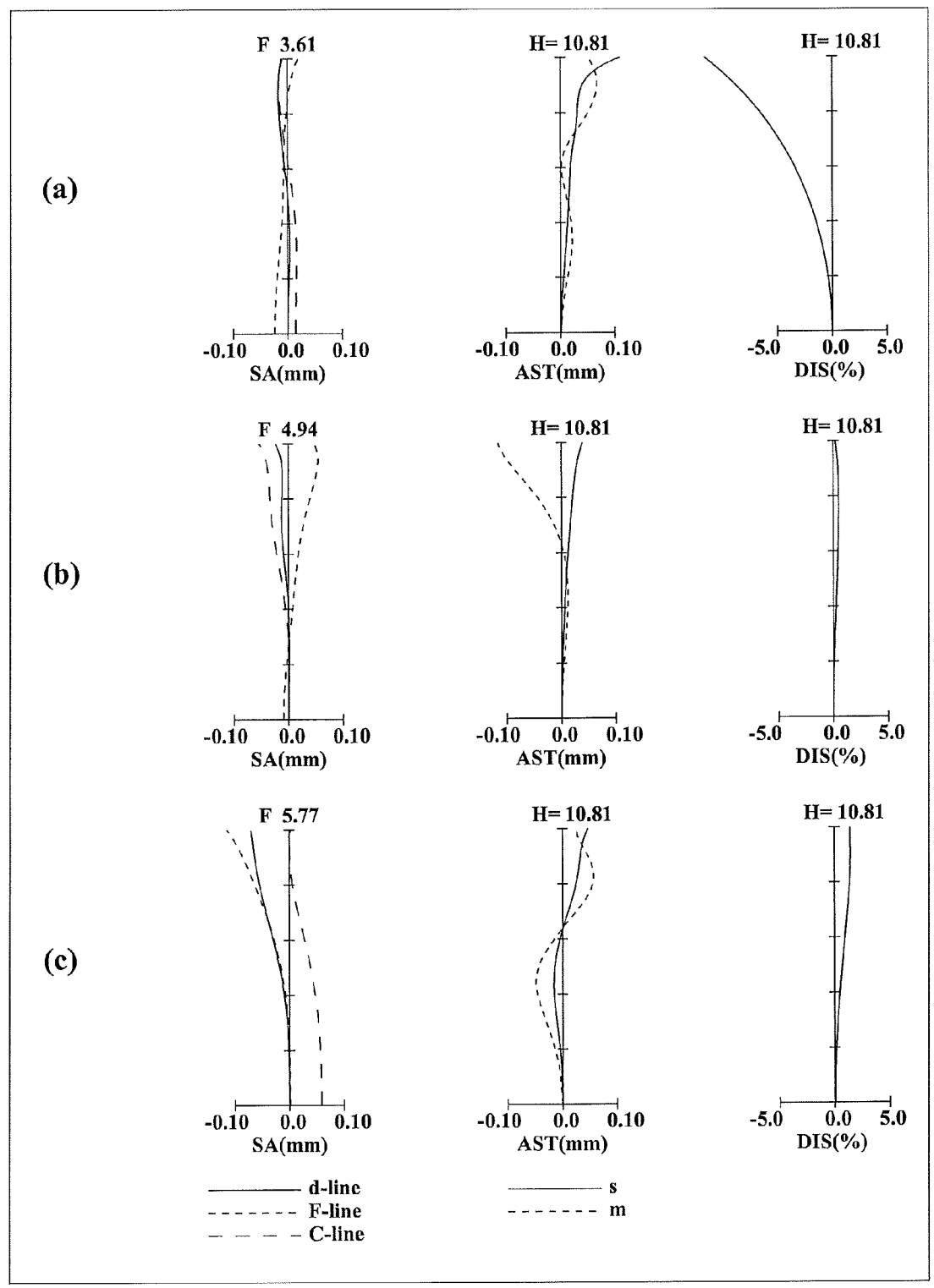
FIG. 14 is a longitudinal aberration diagram showing an infinity in-focus condition of a zoom lens system according to Example 4.
Figure 15:
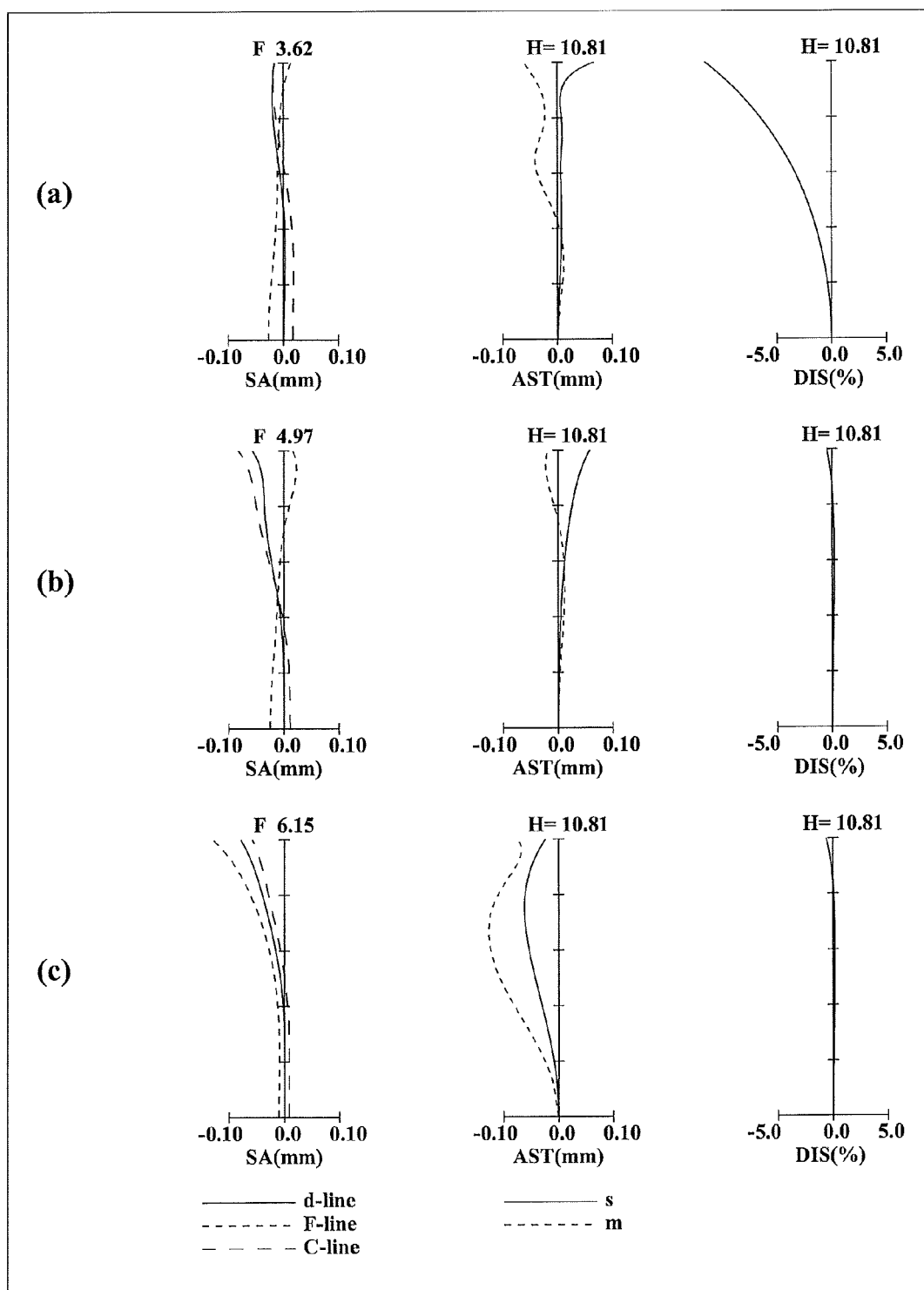
FIG. 15 is a longitudinal aberration diagram of a close-object in-focus condition of a zoom lens system according to Example 4.
Figure 16:
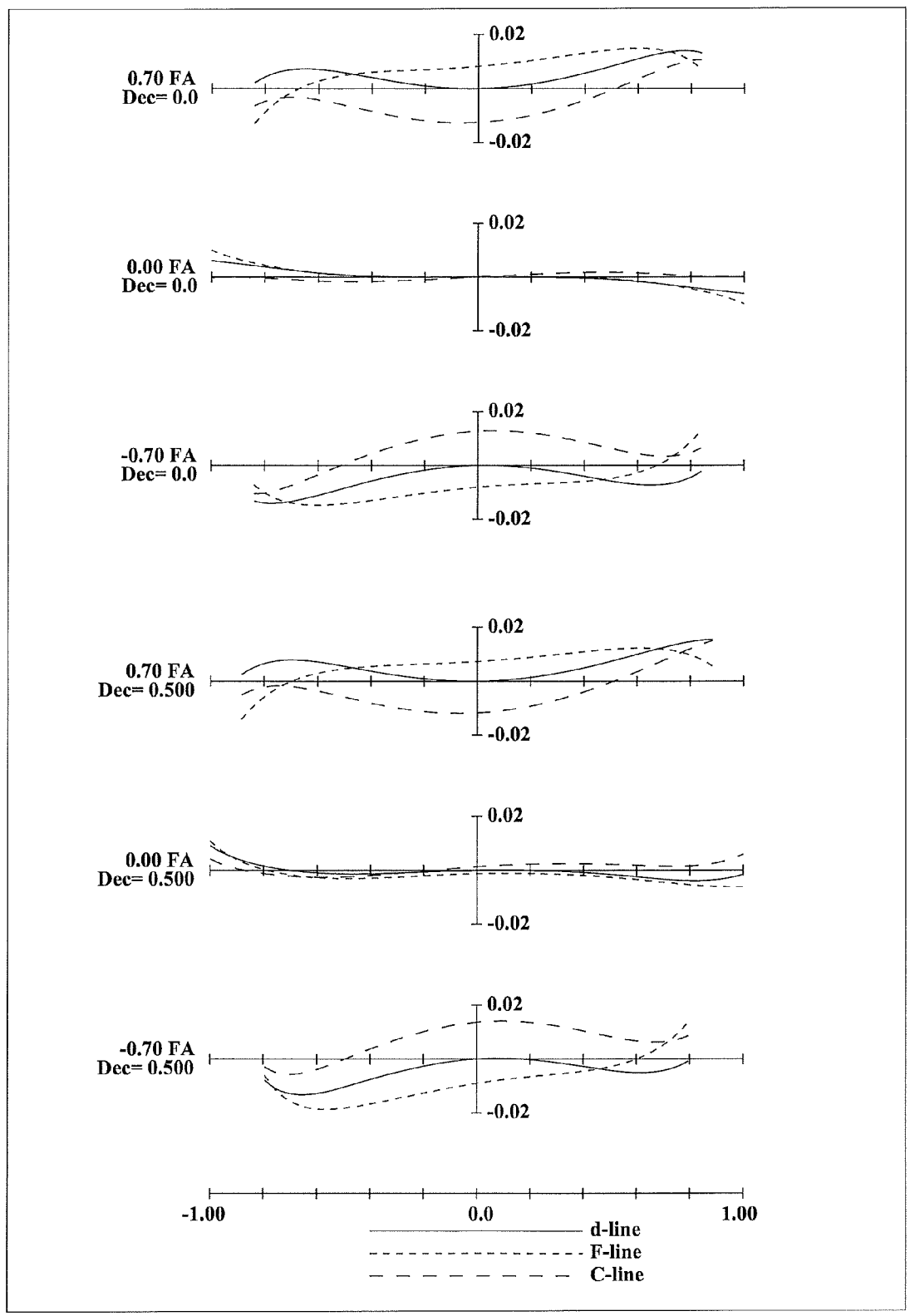
FIG. 16 is a lateral aberration diagram of a zoom lens system according to Example 4 at a telephoto limit in a basic state where image blur compensation is not performed and in an image blur compensation state.
Figure 17:
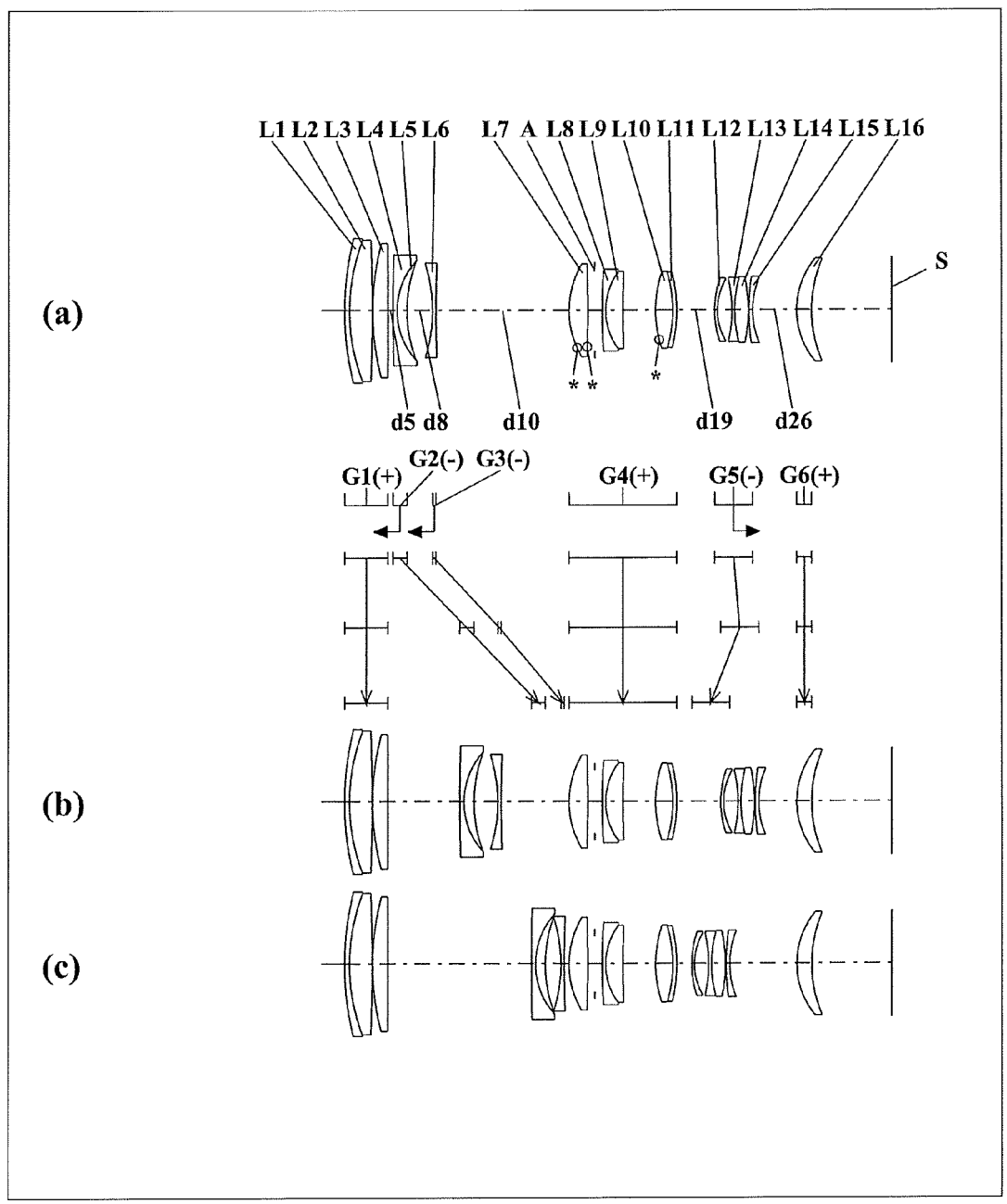
FIG. 17 is a lens arrangement diagram showing an infinity in-focus condition of a zoom lens system according to Embodiment 5 (Example 5)
Figure 18:
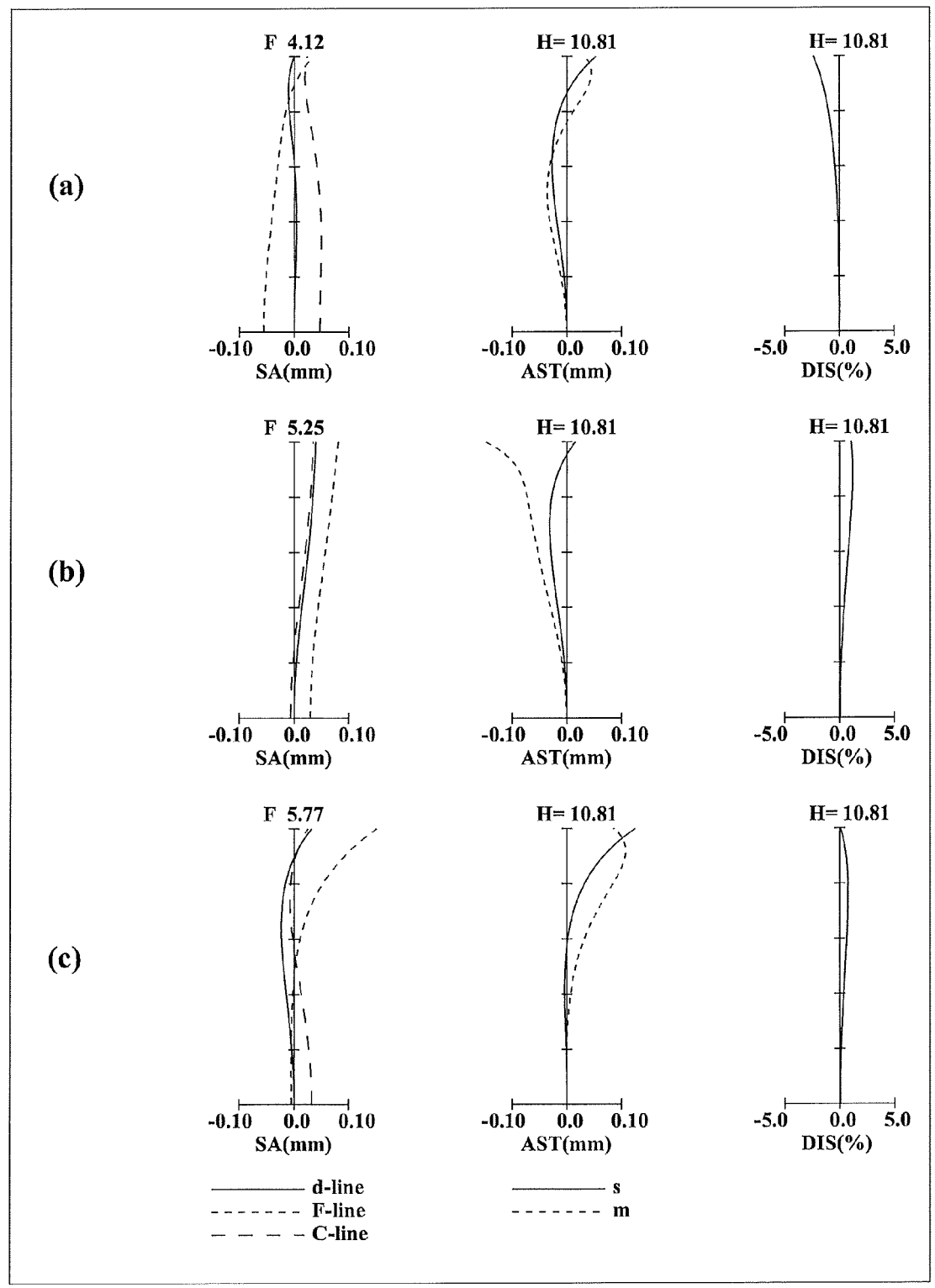
FIG. 18 is a longitudinal aberration diagram showing an infinity in-focus condition of a zoom lens system according to Example 5.
Figure 19:
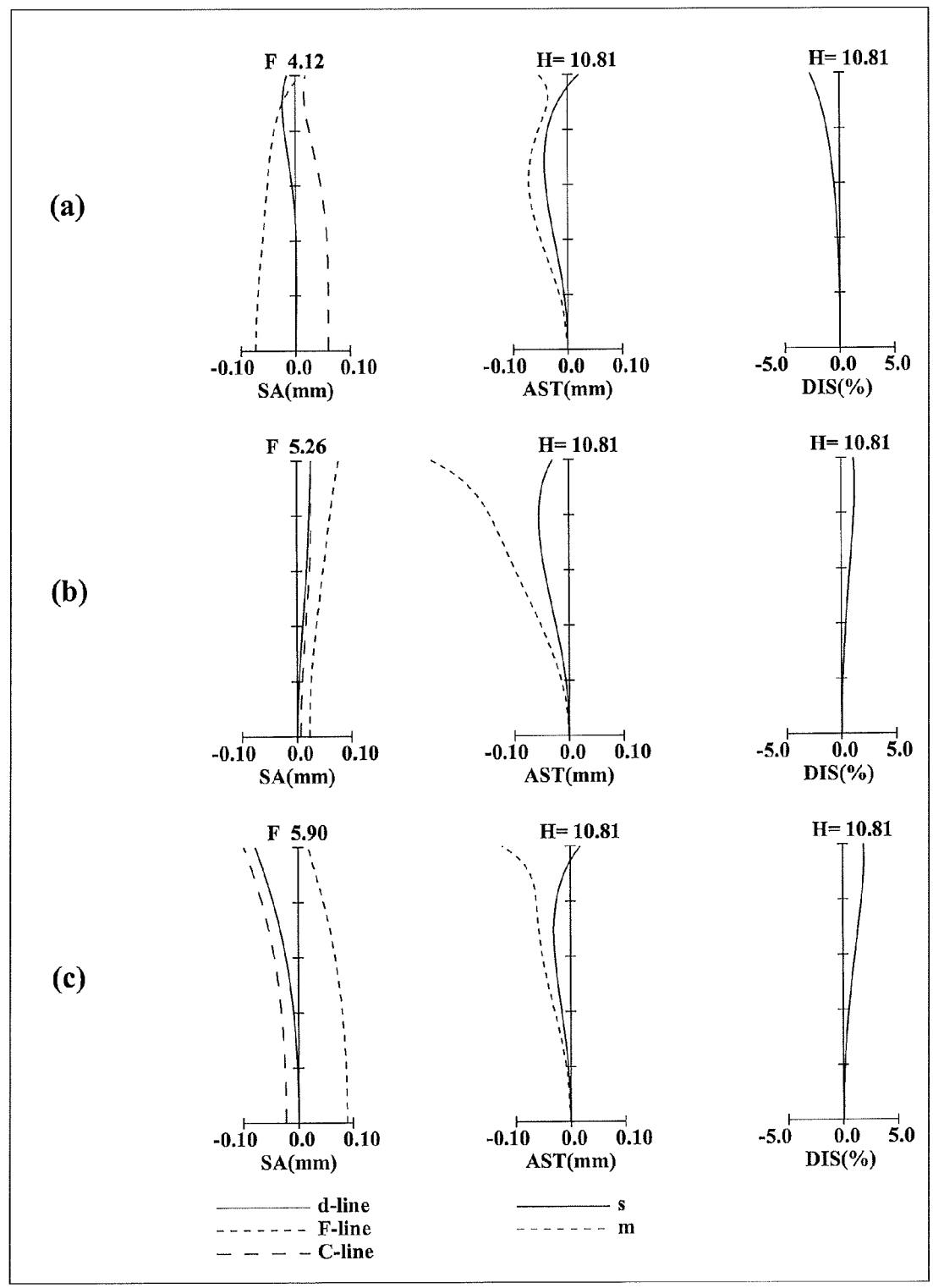
FIG. 19 is a longitudinal aberration diagram of a close-object in-focus condition of a zoom lens system according to Example 5.
Figure 20:
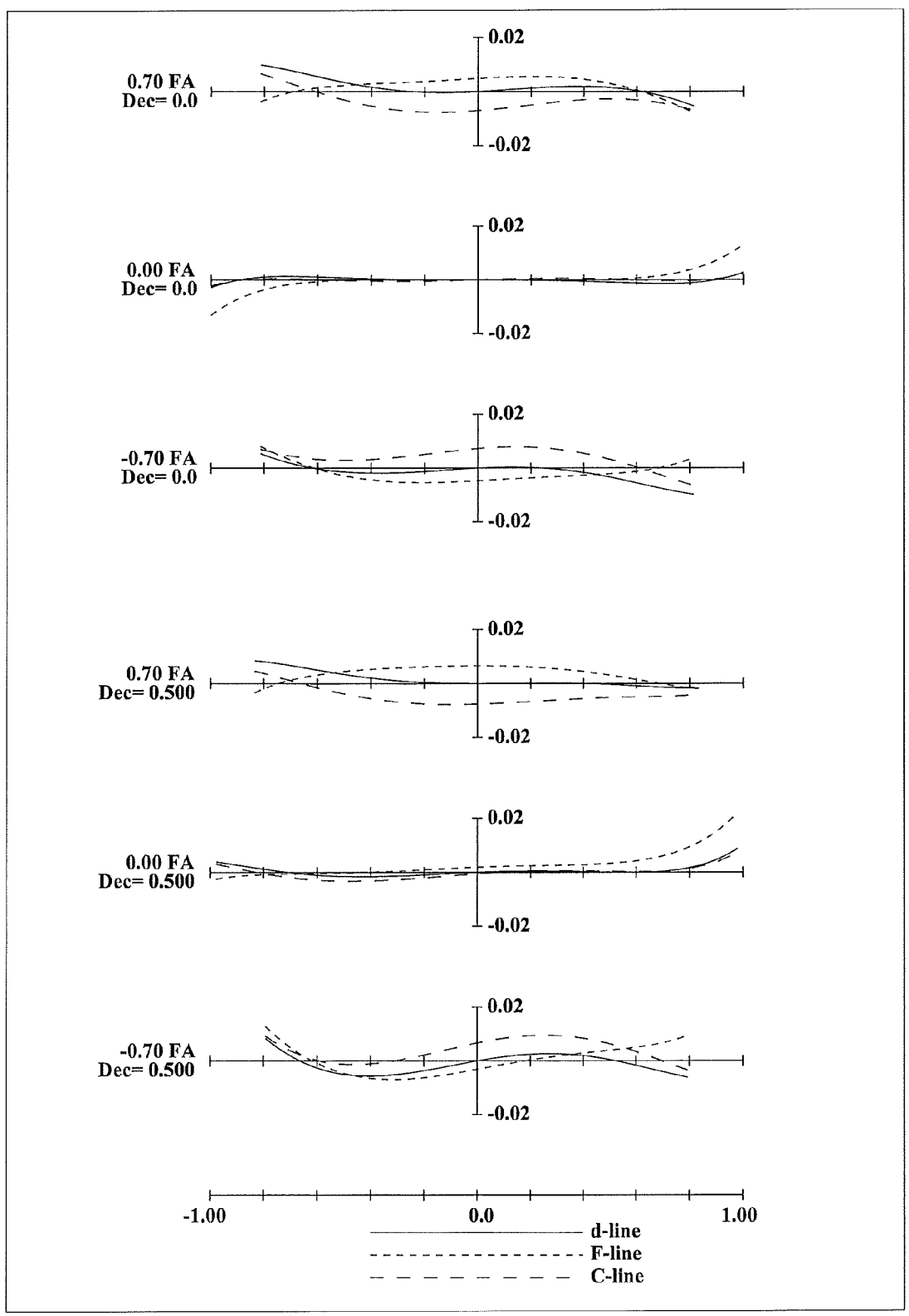
FIG. 20 is a lateral aberration diagram of a zoom lens system according to Example 5 at a telephoto limit in a basic state where image blur compensation is not performed and in an image blur compensation state.
Figure 21:
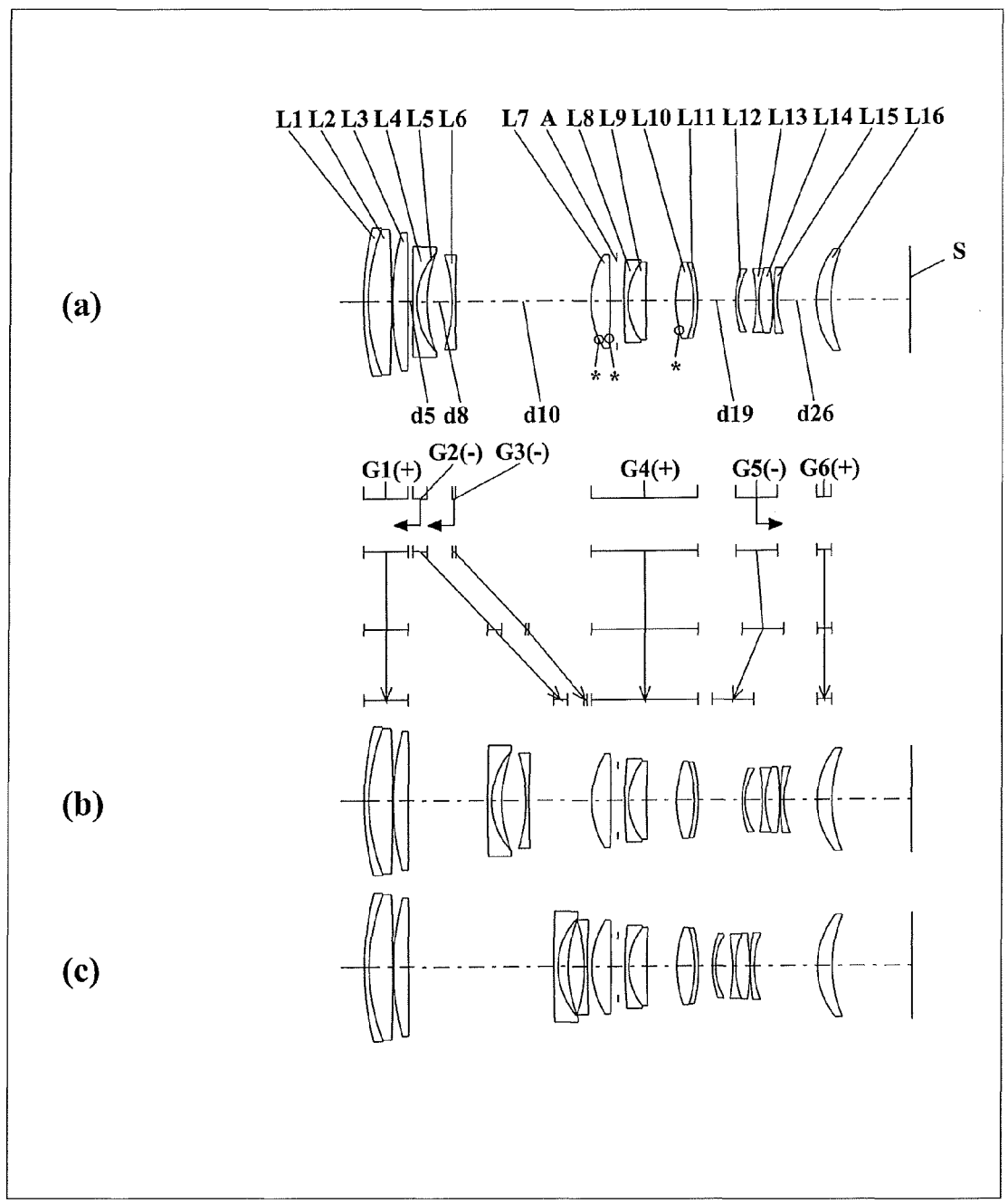
FIG. 21 is a lens arrangement diagram showing an infinity in-focus condition of a zoom lens system according to Embodiment 6 (Example 6)
Figure 22:
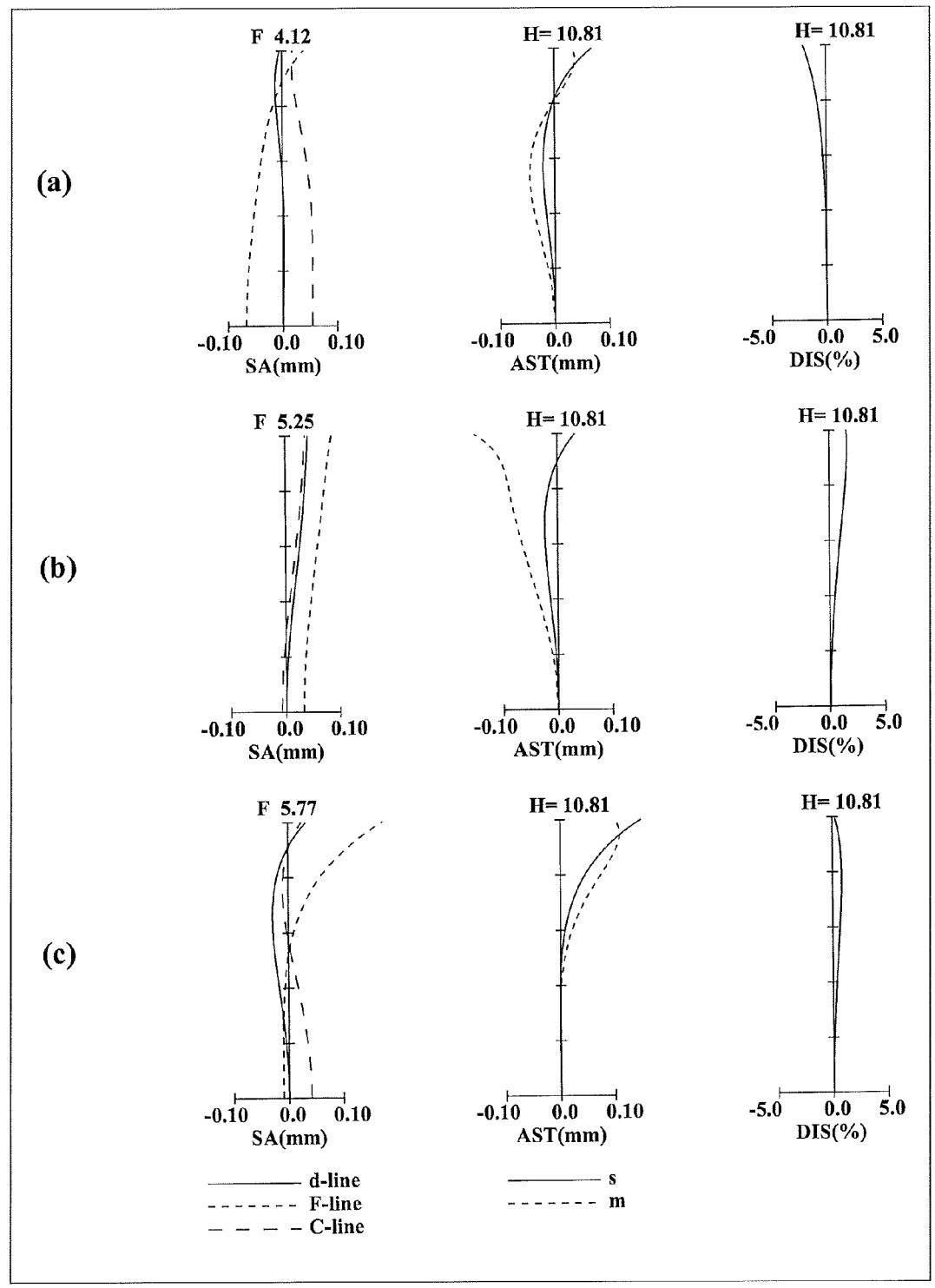
FIG. 22 is a longitudinal aberration diagram showing an infinity in-focus condition of a zoom lens system according to Example 6.
Figure 23:
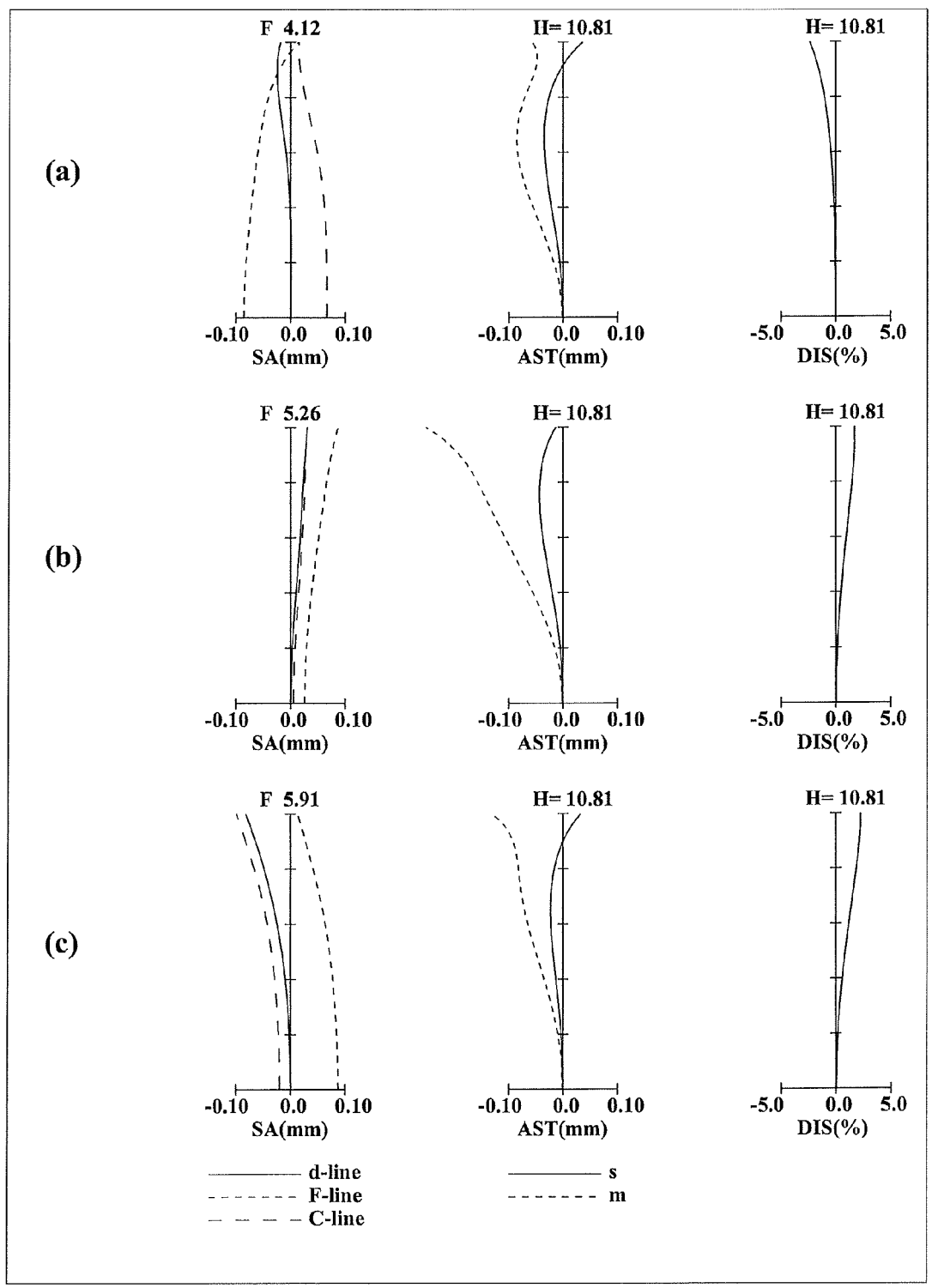
FIG. 23 is a longitudinal aberration diagram of a close-object in-focus condition of a zoom lens system according to Example 6.
Figure 24:
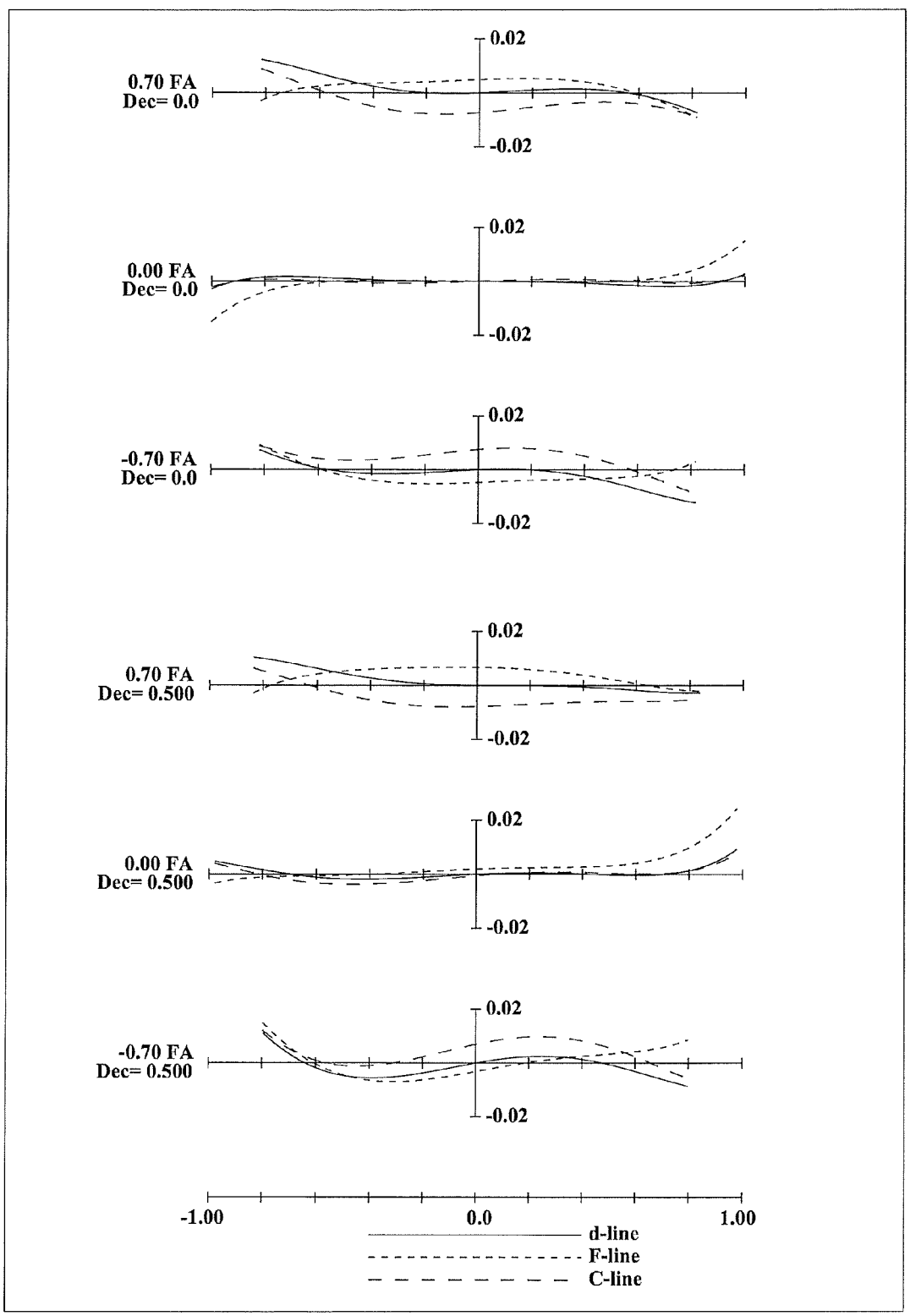
FIG. 24 is a lateral aberration diagram of a zoom lens system according to Example 6 at a telephoto limit in a basic state where image blur compensation is not performed and in an image blur compensation state.

Moreover, in each Fig., an arrow imparted to a lens unit indicates focusing from an infinity in-focus condition to a close-object in-focus condition. That is, in FIGS. 1 and 5, the arrow indicates the moving direction of a second lens unit G2 and a fourth lens unit G4, which are described later, at the time of focusing from an infinity in-focus condition to a close-object in-focus condition. In FIGS. 9 and 13, the arrow indicates the moving direction of the second lens unit G2 and a fifth lens unit G5, which are described later, at the time of focusing from an infinity in-focus condition to a close-object in-focus condition. In FIGS. 17 and 21, the arrow indicates the moving direction of the second lens unit G2, a third lens unit G3, and the fifth lens unit G5, which are described later, at the time of focusing from an infinity in-focus condition to a close-object in-focus condition. In FIGS. 1, 5, 9, 13, 17, and 21, since the symbols of the respective lens units are imparted to part (a), the arrow indicating focusing is placed beneath each symbol of each lens unit for the convenience sake. However, the direction along which each lens unit moves at the time of focusing in each zooming condition will be hereinafter described in detail for each embodiment.

Each of the zoom lens systems according to Embodiments 1 and 2, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power. In the zoom lens systems according to Embodiments 1 and 2, at the time of zooming, the second lens unit G2 and the fourth lens unit G4 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, and the interval between the fourth lens unit G4 and the fifth lens unit G5, vary. In the zoom lens systems according to Embodiments 1 and 2, these lens units are arranged in a desired optical power configuration, and thereby size reduction is achieved in the entire lens system while maintaining high optical performance.

Each of the zoom lens systems according to Embodiments 3 to 6, in order from the object side to the image side, comprises a first lens unit G1 having positive optical power, a second lens unit G2 having negative optical power, a third lens unit G3, a fourth lens unit G4 having positive optical power, a fifth lens unit G5 having negative optical power, and a sixth lens unit G6 having positive optical power. In the zoom lens systems according to Embodiments 3 and 4, the third lens unit G3 has positive optical power. In the zoom lens systems according to Embodiments 5 and 6, the third lens unit G3 has negative optical power. In the zoom lens systems according to Embodiments 3 to 6, at the time of zooming, the second lens unit G2, the third lens unit G3, and the fifth lens unit G5 individually move in the direction along the optical axis so that the intervals between the respective lens units, i.e., the interval between the first lens unit G1 and the second lens unit G2, the interval between the second lens unit G2 and the third lens unit G3, the interval between the third lens unit G3 and the fourth lens unit G4, the interval between the fourth lens unit G4 and the fifth lens unit G5, and the interval between the fifth lens unit G5 and the sixth lens unit G6, vary. In the zoom lens systems according to Embodiments 3 to 6, these lens units are arranged in a desired optical power configuration, and thereby size reduction is achieved in the entire lens system while maintaining high optical performance.

Further, in FIGS. 1, 5, 9, 13, 17, and 21, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S.

Figure 1:
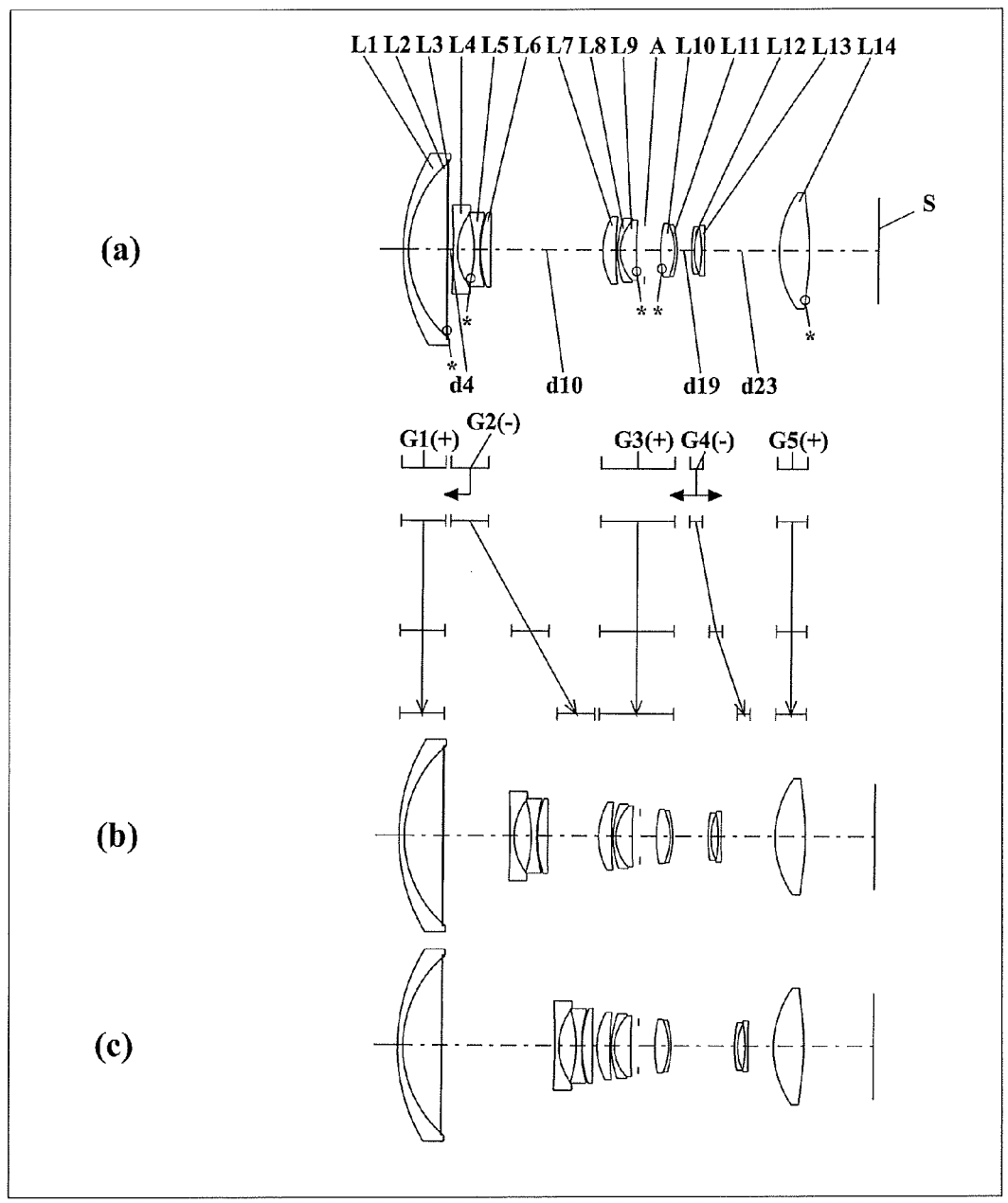
FIG. 1 is a lens arrangement diagram showing an infinity in-focus condition of a zoom lens system according to Embodiment 1 (Example 1)
Figure 2:
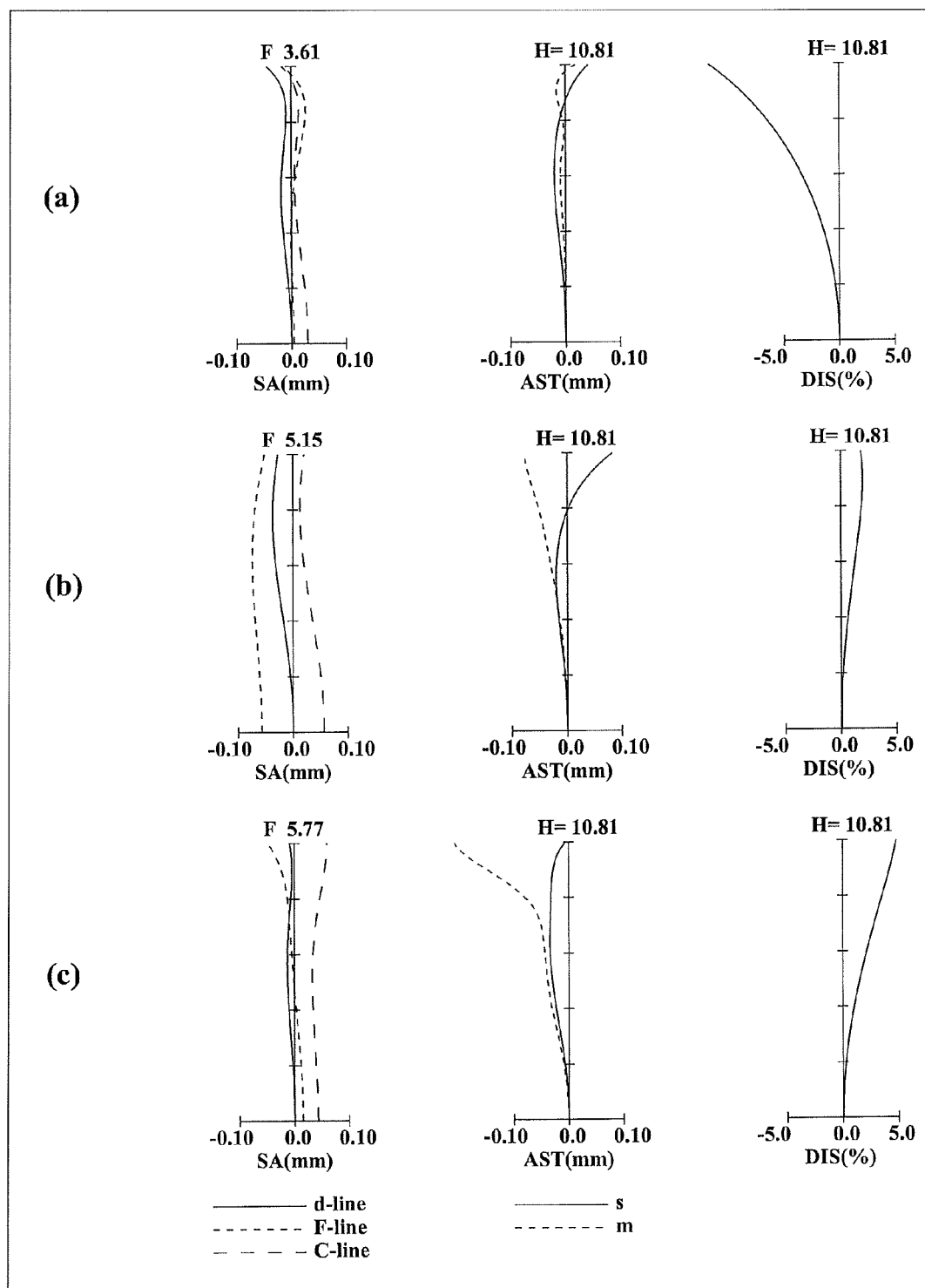
FIG. 2 is a longitudinal aberration diagram of an infinity in-focus condition of a zoom lens system according to Example 1.
Figure 3:
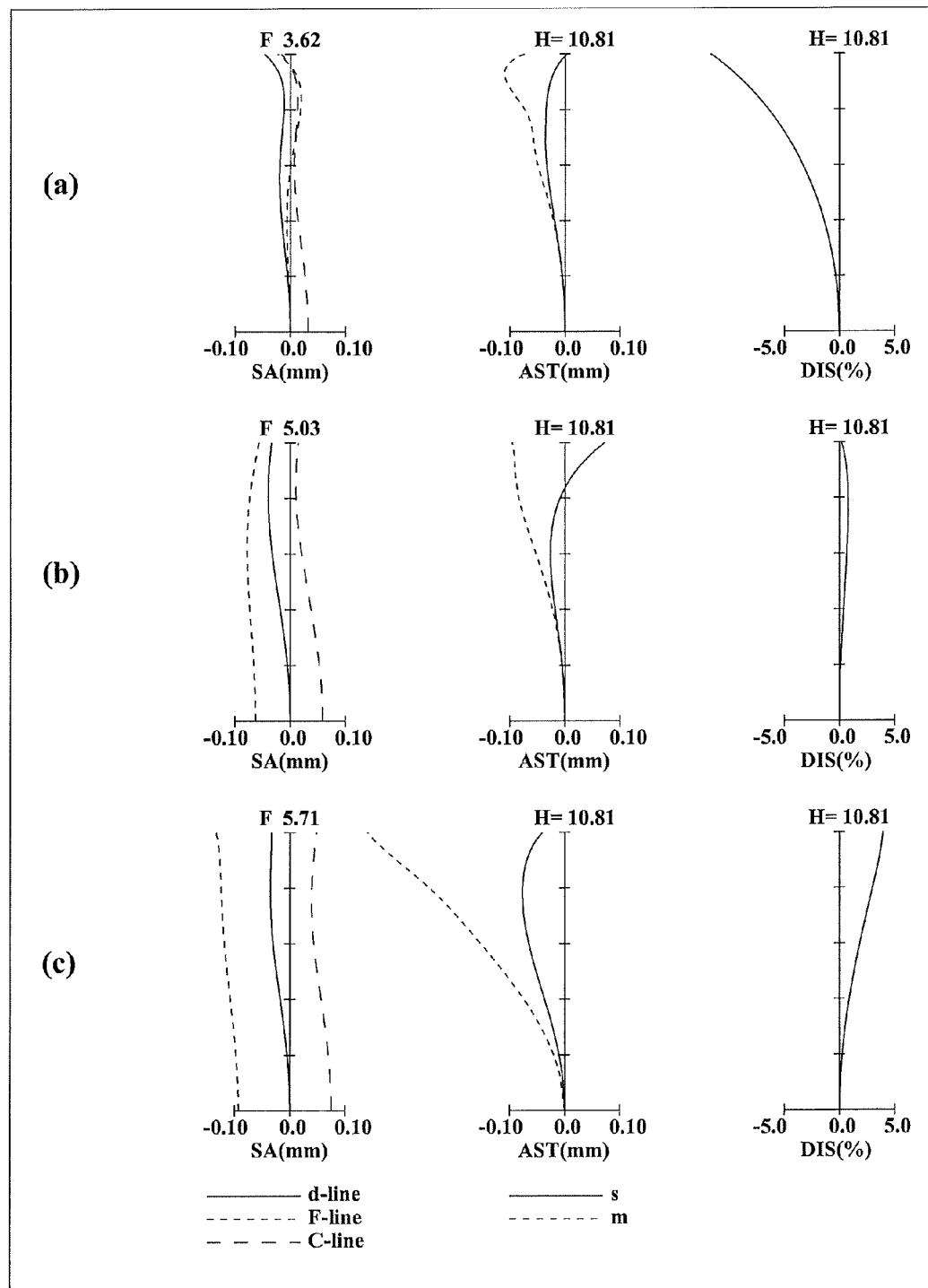
FIG. 3 is a longitudinal aberration diagram of a close-object in-focus condition of a zoom lens system according to Example 1.
Figure 4:
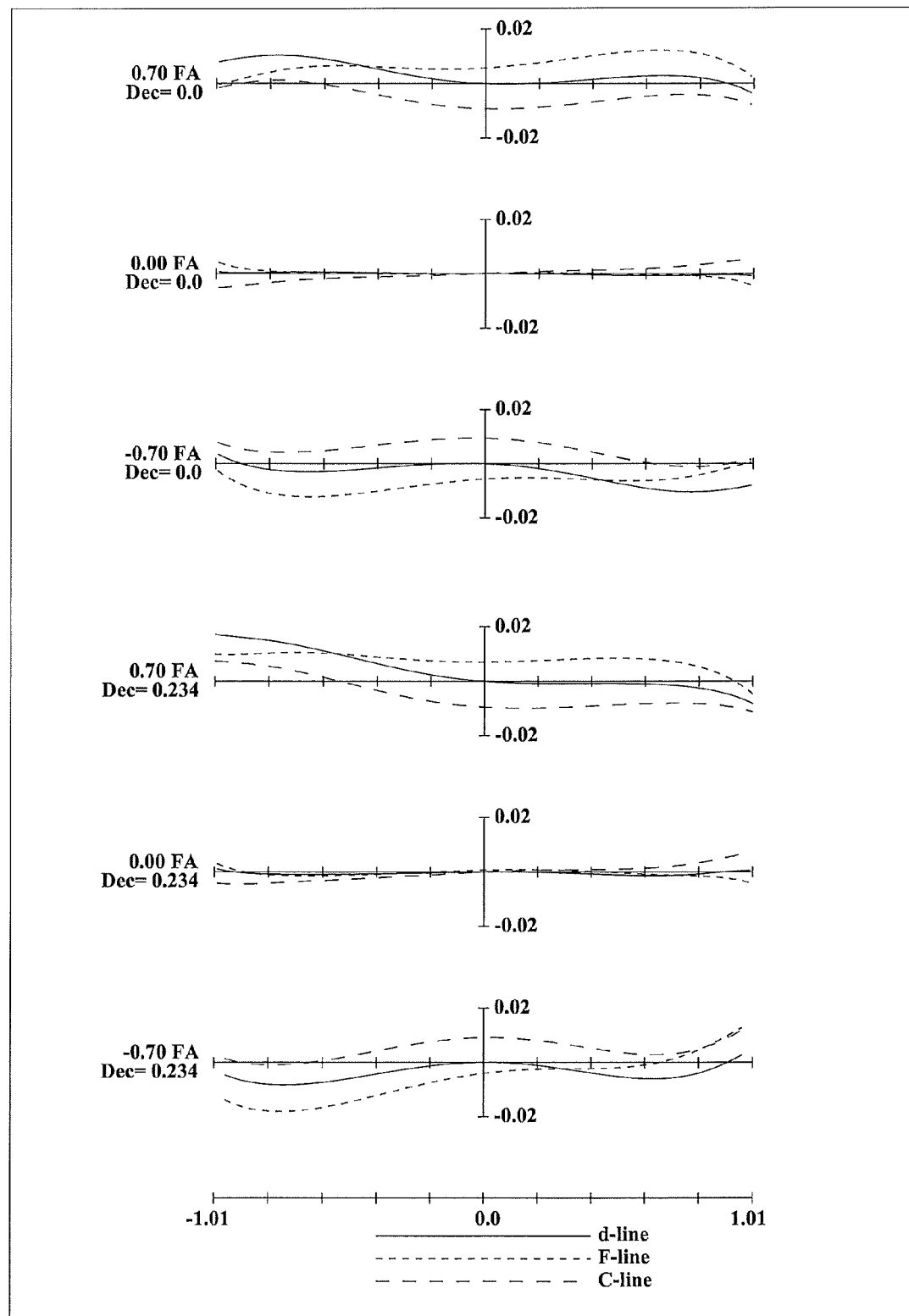
FIG. 4 is a lateral aberration diagram of a zoom lens system according to Example 1 at a telephoto limit in a basic state where image blur compensation is not performed and in an image blur compensation state.
Figure 5:
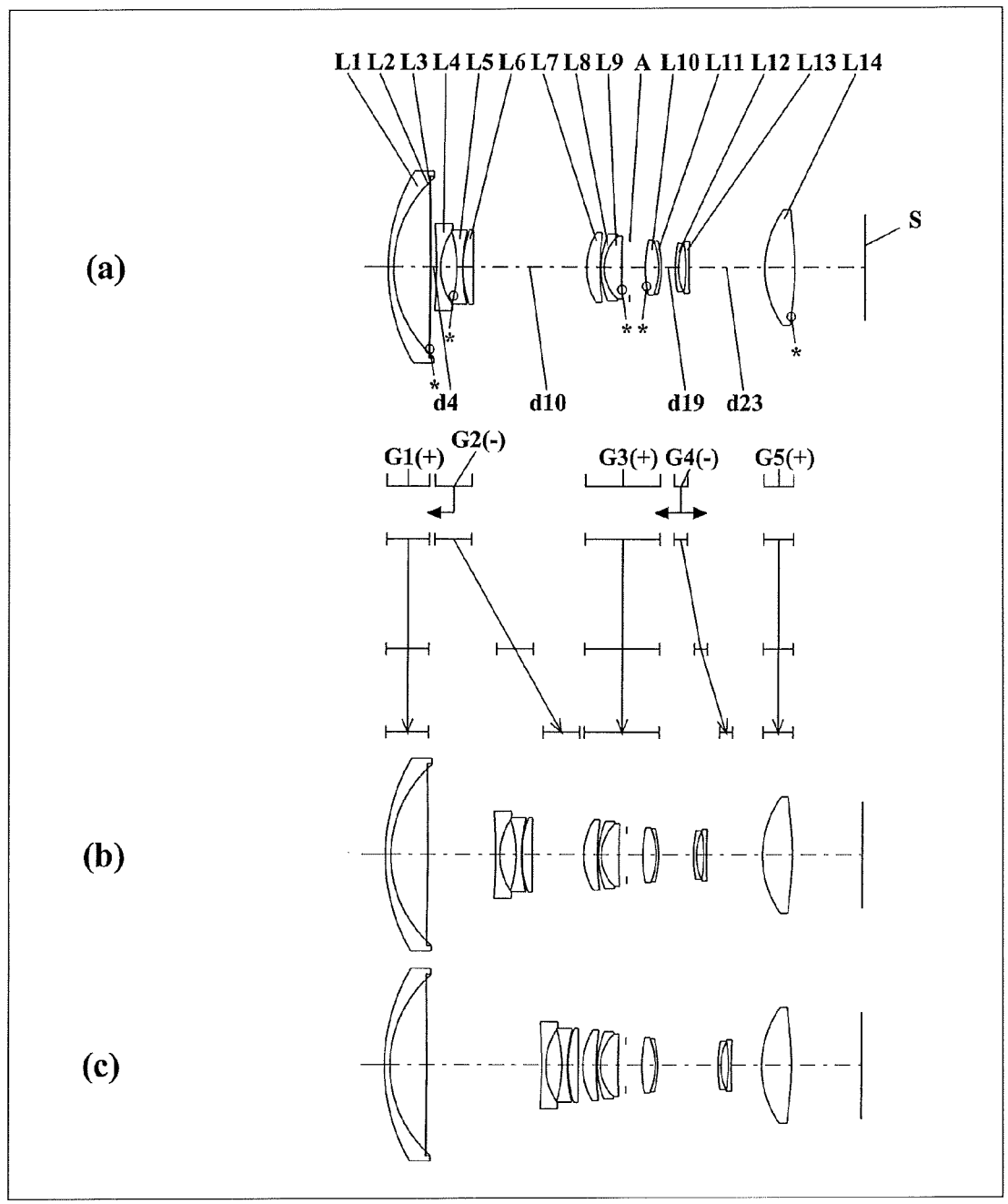
FIG. 5 is a lens arrangement diagram showing an infinity in-focus condition of a zoom lens system according to Embodiment 2 (Example 2)
Figure 6:
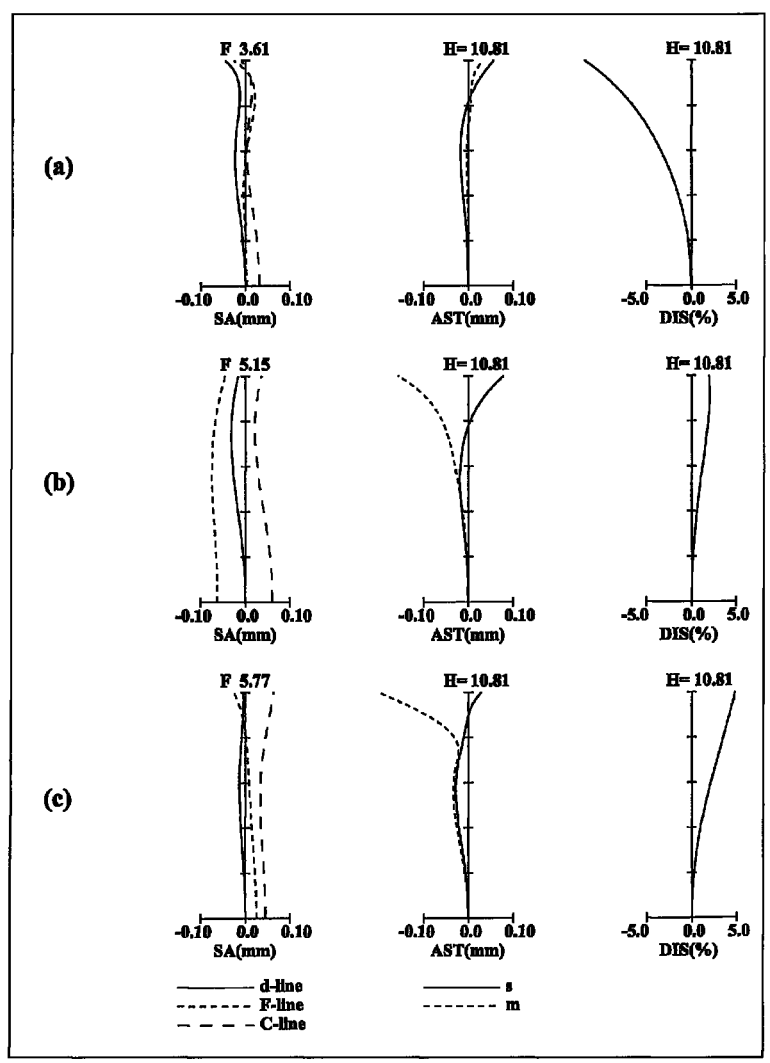
FIG. 6 is a longitudinal aberration diagram showing an infinity in-focus condition of a zoom lens system according to Example 2.
Figure 7:
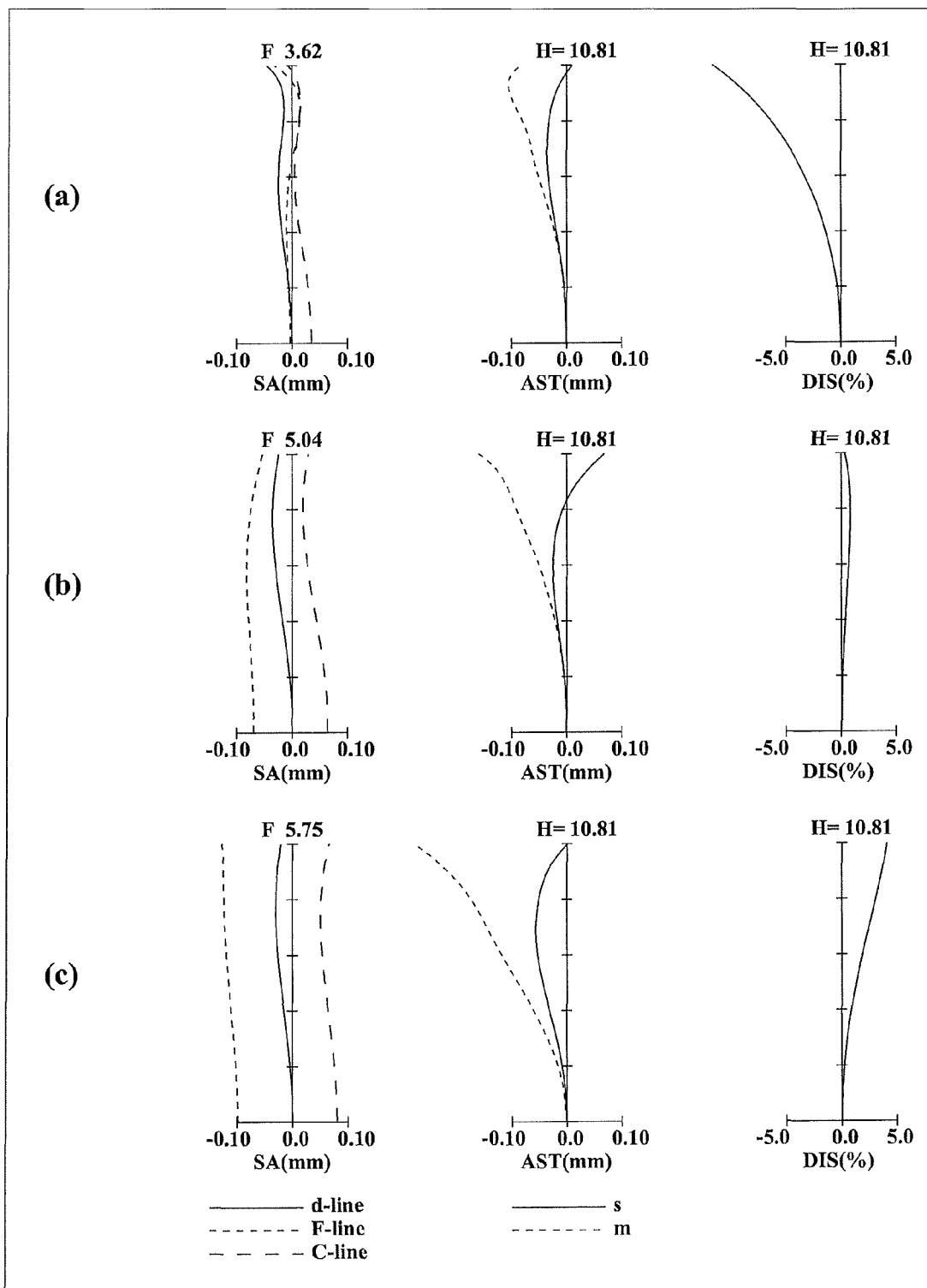
FIG. 7 is a longitudinal aberration diagram of a close-object in-focus condition of a zoom lens system according to Example 2.
Figure 8:
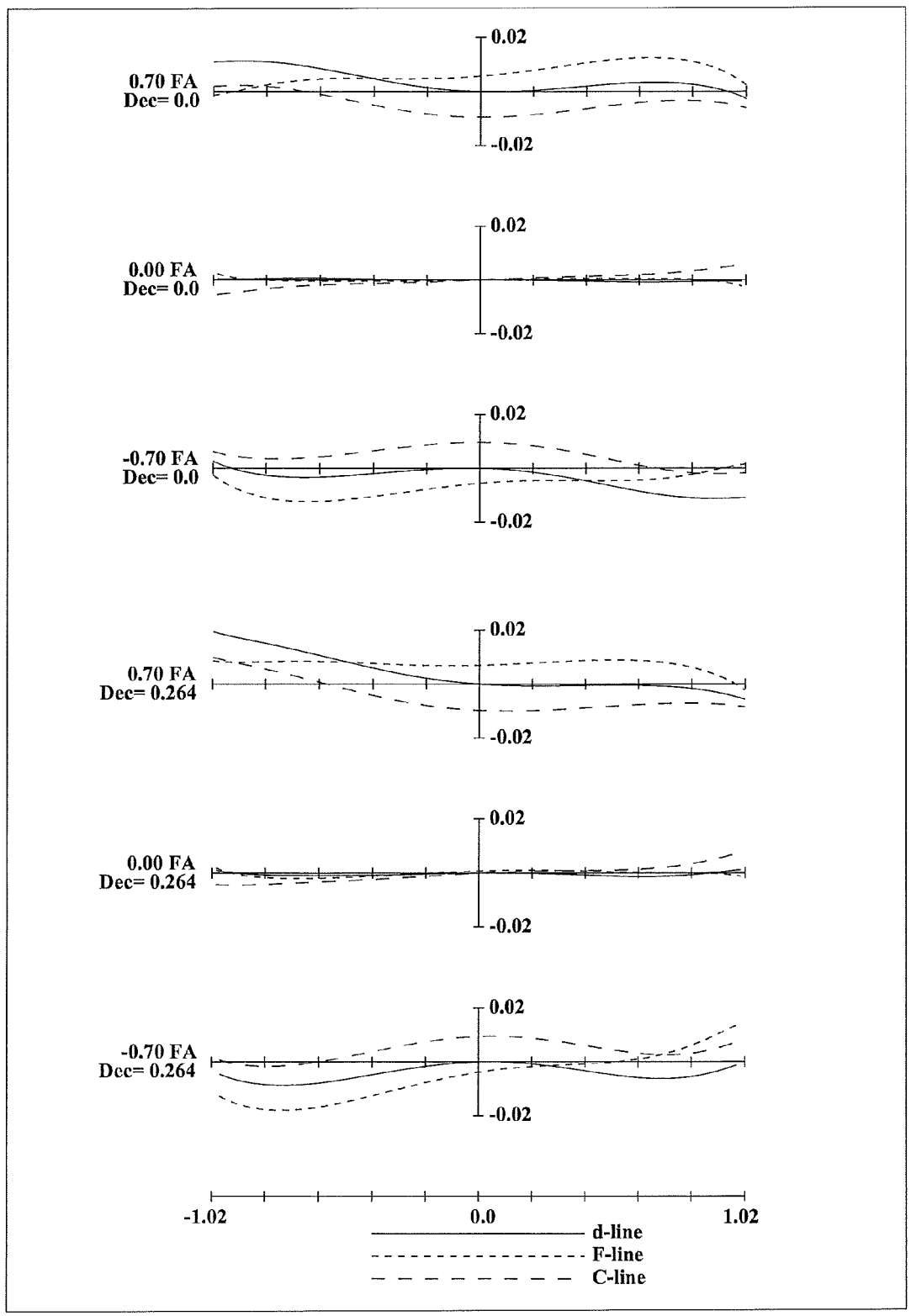
FIG. 8 is a lateral aberration diagram of a zoom lens system according to Example 2 at a telephoto limit in a basic state where image blur compensation is not performed and in an image blur compensation state.

Further, as shown in FIGS. 1 and 5, an aperture diaphragm A is provided between a ninth lens element L9 and a tenth lens element L10 in the third lens unit G3. As shown in FIGS. 9 and 13, an aperture diaphragm A is provided on the most object side in the fourth lens unit G4, i.e., on the object side relative to an eleventh lens element L11. As shown in FIGS. 17 and 21, an aperture diaphragm A is provided between a seventh lens element L7 and an eighth lens element L8 in the fourth lens unit G4.

As shown in FIG. 1, in the zoom lens system according to Embodiment 1, the first lens unit G1, in order from the object side to the image side, comprises a negative meniscus first lens element L1 with the convex surface facing the object side, a positive meniscus second lens element L2 with the convex surface facing the object side, and a bi-convex third lens element L3. The first lens element L1, the second lens element L2, and the third lens element L3 are cemented with each other. The third lens element L3 is an aspherical lens element formed of a thin layer of resin or the like, and has an aspheric image side surface.

In the zoom lens system according to Embodiment 1, the second lens unit G2, in order from the object side to the image side, comprises a bi-concave fourth lens element L4, a bi-concave fifth lens element L5, and a positive meniscus sixth lens element L6 with the convex surface facing the object side. Among these, the fifth lens element L5 has an aspheric object side surface. The second lens unit G2 is a lens unit having the greatest absolute value of optical power among all the lens units, as shown in Numerical Example 1 described later. Also, the second lens unit G2 is a lens unit having the greatest absolute value of a wobbling value at a wide-angle limit among the focusing lens units, as shown in Numerical Example 1 described later.

In the zoom lens system according to Embodiment 1, the third lens unit G3, in order from the object side to the image side, comprises a positive meniscus seventh lens element L7 with the convex surface facing the object side, a negative meniscus eighth lens element L8 with the convex surface facing the object side, a positive meniscus ninth lens element L9 with the convex surface facing the object side, a bi-convex tenth lens element L10, and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The ninth lens element L9 has an aspheric image side surface, and the tenth lens element L10 has an aspheric object side surface. Further, an aperture diaphragm A is provided between the ninth lens element L9 and the tenth lens element L10.

In the zoom lens system according to Embodiment 1, the fourth lens unit G4, in order from the object side to the image side, comprises a negative meniscus twelfth lens element L12 with the convex surface facing the object side, and a bi-concave thirteenth lens element L13.

In the zoom lens system according to Embodiment 1, the fifth lens unit G5 comprises solely a bi-convex fourteenth lens element L14. The fourteenth lens element L14 has an aspheric image side surface.

In the zoom lens system according to Embodiment 1, the fourth lens unit G4 corresponds to a wobbling lens unit described later, which senses a moving direction of the focusing lens units at the time of focusing by wobbling itself in a direction along the optical axis.

In the zoom lens system according to Embodiment 1, the tenth lens element L10 and the eleventh lens element L11 in the third lens unit G3 correspond to an image blur compensating lens unit described later, which moves in a direction perpendicular to the optical axis in order to optically compensate image blur.

In the zoom lens system according to Embodiment 1, at the time of zooming from a wide-angle limit to a telephoto limit during image taking, the second lens unit G2 and the fourth lens unit G4 monotonically move to the image side, and the first lens unit G1, the third lens unit G3, and the fifth lens unit G5 are fixed relative to the image surface S. That is, in zooming, the second lens unit G2 and the fourth lens unit G4 individually move along the optical axis so that the interval between the first lens unit G1 and the second lens unit G2 and the interval between the third lens unit G3 and the fourth lens unit G4 increase, and the interval between the second lens unit G2 and the third lens unit G3 and the interval between the fourth lens unit G4 and the fifth lens unit G5 decrease.

Further, in the zoom lens system according to Embodiment 1, at the time of focusing from an infinity in-focus condition to a close-object in-focus condition, the second lens unit G2 does not move along the optical axis at a wide-angle limit, but moves to the object side along the optical axis in other zooming conditions. Further, at the time of focusing from the infinity in-focus condition to the close-object in-focus condition, the fourth lens unit G4 moves to the image side along the optical axis at a wide-angle limit, and moves to the object side along the optical axis in other zooming conditions.

As shown in FIG. 5, in the zoom lens system according to Embodiment 2, the first lens unit G1, in order from the object side to the image side, comprises a negative meniscus first lens element L1 with the convex surface facing the object side, a bi-convex second lens element L2, and a positive meniscus third lens element L3 with the convex surface facing the image side. The first lens element L1, the second lens element L2, and the third lens element L3 are cemented with each other. The third lens element L3 is an aspherical lens element formed of a thin layer of resin or the like, and has an aspheric image side surface.

In the zoom lens system according to Embodiment 2, the second lens unit G2, in order from the object side to the image side, comprises a bi-concave fourth lens element L4, a bi-concave fifth lens element L5, and a positive meniscus sixth lens element L6 with the convex surface facing the object side. Among these, the fifth lens element L5 has an aspheric object side surface. The second lens unit G2 is a lens unit having the greatest absolute value of optical power among all the lens units, as shown in Numerical Example 2 described later. Also, the second lens unit G2 is a lens unit having the greatest absolute value of a wobbling value at a wide-angle limit among the focusing lens units, as shown in Numerical Example 2 described later.

In the zoom lens system according to Embodiment 2, the third lens unit G3, in order from the object side to the image side, comprises a positive meniscus seventh lens element L7 with the convex surface facing the object side, a negative meniscus eighth lens element L8 with the convex surface facing the object side, a positive meniscus ninth lens element L9 with the convex surface facing the object side, a bi-convex tenth lens element L10, and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The ninth lens element L9 has an aspheric image side surface, and the tenth lens element L10 has an aspheric object side surface. Further, an aperture diaphragm A is provided between the ninth lens element L9 and the tenth lens element L10.

In the zoom lens system according to Embodiment 2, the fourth lens unit G4, in order from the object side to the image side, comprises a negative meniscus twelfth lens element L12 with the convex surface facing the object side, and a bi-concave thirteenth lens element L13.

In the zoom lens system according to Embodiment 2, the fifth lens unit G5 comprises solely a bi-convex fourteenth lens element L14. The fourteenth lens element L14 has an aspheric image side surface.

In the zoom lens system according to Embodiment 2, the fourth lens unit G4 corresponds to a wobbling lens unit described later, which senses a moving direction of the focusing lens units at the time of focusing by wobbling itself in a direction along the optical axis.

In the zoom lens system according to Embodiment 2, the tenth lens element L10 and the eleventh lens element L11 in the third lens unit G3 correspond to an image blur compensating lens unit described later, which moves in a direction perpendicular to the optical axis in order to optically compensate image blur.

In the zoom lens system according to Embodiment 2, at the time of zooming from a wide-angle limit to a telephoto limit during image taking, the second lens unit G2 and the fourth lens unit G4 monotonically move to the image side, and the first lens unit G1, the third lens unit G3, and the fifth lens unit G5 are fixed relative to the image surface S. That is, in zooming, the second lens unit G2 and the fourth lens unit G4 individually move along the optical axis so that the interval between the first lens unit G1 and the second lens unit G2 and the interval between the third lens unit G3 and the fourth lens unit G4 increase, and the interval between the second lens unit G2 and the third lens unit G3 and the interval between the fourth lens unit G4 and the fifth lens unit G5 decrease.

Further, in the zoom lens system according to Embodiment 2, at the time of focusing from an infinity in-focus condition to a close-object in-focus condition, the second lens unit G2 does not move along the optical axis at a wide-angle limit, but moves to the object side along the optical axis in other zooming conditions. Further, at the time of focusing from the infinity in-focus condition to the close-object in-focus condition, the fourth lens unit G4 moves to the image side along the optical axis at a wide-angle limit, and moves to the object side along the optical axis in other zooming conditions.

As shown in FIG. 9, in the zoom lens system according to Embodiment 3, the first lens unit G1, in order from the object side to the image side, comprises a negative meniscus first lens element L1 with the convex surface facing the object side, a bi-convex second lens element L2, and a positive meniscus third lens element L3 with the convex surface facing the object side. Among these, the first lens element L1 and the second lens element L2 are cemented with each other.

In the zoom lens system according to Embodiment 3, the second lens unit G2, in order from the object side to the image side, comprises a positive meniscus fourth lens element L4 with the convex surface facing the image side, a bi-concave fifth lens element L5, a bi-concave sixth lens element L6, and a bi-convex seventh lens element L7. Among these, the fourth lens element L4 and the fifth lens element L5 are cemented with each other. The fourth lens element L4 is an aspherical lens element formed of a thin layer of resin or the like, and has an aspheric object side surface. The second lens unit G2 is a lens unit having the greatest absolute value of optical power among all the lens units, as shown in Numerical Example 3 described later. Also, the second lens unit G2 is a lens unit having the greatest absolute value of a wobbling value at a wide-angle limit among the focusing lens units, as shown in Numerical Example 3 described later.

In the zoom lens system according to Embodiment 3, the third lens unit G3, in order from the object side to the image side, comprises a bi-convex eighth lens element L8, a negative meniscus ninth lens element L9 with the convex surface facing the object side, and a bi-convex tenth lens element L10. Among these, the ninth lens element L9 and the tenth lens element L10 are cemented with each other. The eighth lens element L8 has two aspheric surfaces.

In the zoom lens system according to Embodiment 3, the fourth lens unit G4, in order from the object side to the image side, comprises a bi-convex eleventh lens element L11, and a negative meniscus twelfth lens element L12 with the convex surface facing the image side. The eleventh lens element L11 and the twelfth lens element L12 are cemented with each other. The eleventh lens element L11 has an aspheric object-side surface. Further, an aperture diaphragm A is provided on the object side relative to the eleventh lens element L11.

In the zoom lens system according to Embodiment 3, the fifth lens unit G5, in order from the object side to the image side, comprises a negative meniscus thirteenth lens element L13 with the convex surface facing the object side, a bi-concave fourteenth lens element L14, a bi-convex fifteenth lens element L15, and a bi-convex sixteenth lens element L16. Among these, the fourteenth lens element L14 and the fifteenth lens element L15 are cemented with each other. The sixteenth lens element L16 has two aspheric surfaces.

In the zoom lens system according to Embodiment 3, the sixth lens unit G6 comprises solely a positive meniscus seventeenth lens element L17 with the convex surface facing the object side. The seventeenth lens element L17 has two aspheric surfaces.

In the zoom lens system according to Embodiment 3, the fifth lens unit G5 corresponds to a wobbling lens unit described later, which senses a moving direction of the focusing lens units at the time of focusing by wobbling itself in a direction along the optical axis.

In the zoom lens system according to Embodiment 3, the eleventh lens element L11 and the twelfth lens element L12 in the fourth lens unit G4 correspond to an image blur compensating lens unit described later, which moves in a direction perpendicular to the optical axis in order to optically compensate image blur.

In the zoom lens system according to Embodiment 3, at the time of zooming from a wide-angle limit to a telephoto limit during image taking, the second lens unit G2 monotonically moves to the image side, the third lens unit G3 moves with locus of a convex to the object side, and the fifth lens unit G5 moves with locus of a convex to the image side so that its position is closer to the image side at a telephoto limit than at a wide-angle limit. Further, the first lens unit G1, the fourth lens unit G4, and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, and the interval between the second lens unit G2 and the third lens unit G3 and the interval between the fifth lens unit G5 and the sixth lens unit G6 decrease.

Further, in the zoom lens system according to Embodiment 3, at the time of focusing from an infinity in-focus condition to a close-object in-focus condition, the second lens unit G2 does not move along the optical axis at a wide-angle limit, but moves to the object side along the optical axis in other zooming conditions. Further, at the time of focusing from the infinity in-focus condition to the close-object in-focus condition, the fifth lens unit G5 moves to the image side along the optical axis at a wide-angle limit and at a telephoto limit, and moves to the object side along the optical axis in other zooming conditions.

As shown in FIG. 13, in the zoom lens system according to Embodiment 4, the first lens unit G1, in order from the object side to the image side, comprises a negative meniscus first lens element L1 with the convex surface facing the object side, a bi-convex second lens element L2, and a positive meniscus third lens element L3 with the convex surface facing the object side. Among these, the first lens element L1 and the second lens element L2 are cemented with each other.

In the zoom lens system according to Embodiment 4, the second lens unit G2, in order from the object side to the image side, comprises a negative meniscus fourth lens element L4 with the convex surface facing the image side, a bi-concave fifth lens element L5, a bi-concave sixth lens element L6, and a bi-convex seventh lens element L7. Among these, the fourth lens element L4 and the fifth lens element L5 are cemented with each other. The fourth lens element L4 is an aspherical lens element formed of a thin layer of resin or the like, and has an aspheric object side surface. The second lens unit G2 is a lens unit having the greatest absolute value of optical power among all the lens units, as shown in Numerical Example 4 described later. Also, the second lens unit G2 is a lens unit having the greatest absolute value of a wobbling value at a wide-angle limit among the focusing lens units, as shown in Numerical Example 4 described later.

In the zoom lens system according to Embodiment 4, the third lens unit G3, in order from the object side to the image side, comprises a bi-convex eighth lens element L8, a negative meniscus ninth lens element L9 with the convex surface facing the object side, and a bi-convex tenth lens element L10. Among these, the ninth lens element L9 and the tenth lens element L10 are cemented with each other. The eighth lens element L8 has two aspheric surfaces.

In the zoom lens system according to Embodiment 4, the fourth lens unit G4, in order from the object side to the image side, comprises a bi-convex eleventh lens element L11, and a negative meniscus twelfth lens element L12 with the convex surface facing the image side. The eleventh lens element L11 and the twelfth lens element L12 are cemented with each other. The eleventh lens element L11 has an aspheric object side surface. Further, an aperture diaphragm A is provided on the object side relative to the eleventh lens element L11.

In the zoom lens system according to Embodiment 4, the fifth lens unit G5, in order from the object side to the image side, comprises a negative meniscus thirteenth lens element L13 with the convex surface facing the object side, a bi-concave fourteenth lens element L14, a bi-convex fifteenth lens element L15, and a bi-convex sixteenth lens element L16. Among these, the fourteenth lens element L14 and the fifteenth lens element L15 are cemented with each other. The sixteenth lens element L16 has two aspheric surfaces.

In the zoom lens system according to Embodiment 4, the sixth lens unit G6 comprises solely a positive meniscus seventeenth lens element L17 with the convex surface facing the object side. The seventeenth lens element L17 has two aspheric surfaces.

In the zoom lens system according to Embodiment 4, the fifth lens unit G5 corresponds to a wobbling lens unit described later, which senses a moving direction of the focusing lens units at the time of focusing by wobbling itself in a direction along the optical axis.

In the zoom lens system according to Embodiment 4, the eleventh lens element L11 and the twelfth lens element L12 in the fourth lens unit G4 correspond to an image blur compensating lens unit described later, which moves in a direction perpendicular to the optical axis in order to optically compensate image blur.

In the zoom lens system according to Embodiment 4, at the time of zooming from a wide-angle limit to a telephoto limit during image taking, the second lens unit G2 monotonically moves to the image side, the third lens unit G3 moves with locus of a convex to the object side, and the fifth lens unit G5 moves with locus of a convex to the image side so that its position is closer to the image side at a telephoto limit than at a wide-angle limit. Further, the first lens unit G1, the fourth lens unit G4, and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fourth lens unit G4 and the fifth lens unit G5 increase, and the interval between the second lens unit G2 and the third lens unit G3 and the interval between the fifth lens unit G5 and the sixth lens unit G6 decrease.

Further, in the zoom lens system according to Embodiment 4, at the time of focusing from an infinity in-focus condition to a close-object in-focus condition, the second lens unit G2 does not move along the optical axis at a wide-angle limit, but moves to the object side along the optical axis in other zooming conditions. Further, at the time of focusing from the infinity in-focus condition to the close-object in-focus condition, the fifth lens unit G5 moves to the image side along the optical axis in all zooming conditions.

As shown in FIG. 17, in the zoom lens system according to Embodiment 5, the first lens unit G1, in order from the object side to the image side, comprises a negative meniscus first lens element L1 with the convex surface facing the object side, a bi-convex second lens element L2, and a bi-convex third lens element L3. Among these, the first lens element L1 and the second lens element L2 are cemented with each other.

In the zoom lens system according to Embodiment 5, the second lens unit G2, in order from the object side to the image side, comprises a negative meniscus fourth lens element L4 with the convex surface facing the object side, and a positive meniscus fifth lens element L5 with the convex surface facing the object side. The fourth lens element L4 and the fifth lens element L5 are cemented with each other. The second lens unit G2 is a lens unit having the greatest absolute value of a wobbling value at a wide-angle limit among the focusing lens units, as shown in Numerical Example 5 described later.

In the zoom lens system according to Embodiment 5, the third lens unit G3 comprises solely a bi-concave sixth lens element L6.

In the zoom lens system according to Embodiment 5, the fourth lens unit G4, in order from the object side to the image side, comprises a bi-convex seventh lens element L7, a negative meniscus eighth lens element L8 with the convex surface facing the object side, a positive meniscus ninth lens element L9 with the convex surface facing the object side, a bi-convex tenth lens element L10, and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 5, the fifth lens unit G5, in order from the object side to the image side, comprises a negative meniscus twelfth lens element L12 with the convex surface facing the object side, a bi-concave thirteenth lens element L13, a bi-convex fourteenth lens element L14, and a negative meniscus fifteenth lens element L15 with the convex surface facing the object side. Among these, the thirteenth lens element L13 and the fourteenth lens element L14 are cemented with each other. The fifth lens unit G5 is a lens unit having the greatest absolute value of optical power among all the lens units, as shown in Numerical Example 5 described later.

In the zoom lens system according to Embodiment 5, the sixth lens unit G6 comprises solely a positive meniscus sixteenth lens element L16 with the convex surface facing the object side.

In the zoom lens system according to Embodiment 5, the fifth lens unit G5 corresponds to a wobbling lens unit described later, which senses a moving direction of the focusing lens units at the time of focusing by wobbling itself in a direction along the optical axis.

In the zoom lens system according to Embodiment 5, the tenth lens element L10 and the eleventh lens element L11 in the fourth lens unit G4 correspond to an image blur compensating lens unit described later, which moves in a direction perpendicular to the optical axis in order to optically compensate image blur.

In the zoom lens system according to Embodiment 5, at the time of zooming from a wide-angle limit to a telephoto limit during image taking, the second lens unit G2 and the third lens unit G3 monotonically move to the image side, and the fifth lens unit G5 moves to the object side with locus of a convex to the image side. The first lens unit G1, the fourth lens unit G4, and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fifth lens unit G5 and the sixth lens unit G6 increase, and the interval between the third lens unit G3 and the fourth lens unit G4 and the interval between the fourth lens unit G4 and the fifth lens unit G5 decrease.

Further, in the zoom lens system according to Embodiment 5, at the time of focusing from an infinity in-focus condition to a close-object in-focus condition, the second lens unit G2 moves to the object side along the optical axis at a telephoto limit, but does not move along the optical axis in other zooming conditions. Further, at the time of focusing from the infinity in-focus condition to the close-object in-focus condition, the third lens unit G3 moves to the object side along the optical axis in all zooming conditions. Further, at the time of focusing from the infinity in-focus condition to the close-object in-focus condition, the fifth lens unit G5 does not move along the optical axis at a wide-angle limit, but moves to the image side along the optical axis in other zooming conditions.

As shown in FIG. 21, in the zoom lens system according to Embodiment 6, the first lens unit G1, in order from the object side to the image side, comprises a negative meniscus first lens element L1 with the convex surface facing the object side, a bi-convex second lens element L2, and a bi-convex third lens element L3. Among these, the first lens element L1 and the second lens element L2 are cemented with each other.

In the zoom lens system according to Embodiment 6, the second lens unit G2, in order from the object side to the image side, comprises a negative meniscus fourth lens element L4 with the convex surface facing the object side, and a positive meniscus fifth lens element L5 with the convex surface facing the object side. The fourth lens element L4 and the fifth lens element L5 are cemented with each other. The second lens unit G2 is a lens unit having the greatest absolute value of a wobbling value at a wide-angle limit among the focusing lens units, as shown in Numerical Example 6 described later.

In the zoom lens system according to Embodiment 6, the third lens unit G3 comprises solely a bi-concave sixth lens element L6.

In the zoom lens system according to Embodiment 6, the fourth lens unit G4, in order from the object side to the image side, comprises a bi-convex seventh lens element L7, a negative meniscus eighth lens element L8 with the convex surface facing the object side, a positive meniscus ninth lens element L9 with the convex surface facing the object side, a bi-convex tenth lens element L10, and a negative meniscus eleventh lens element L11 with the convex surface facing the image side. Among these, the eighth lens element L8 and the ninth lens element L9 are cemented with each other, and the tenth lens element L10 and the eleventh lens element L11 are cemented with each other. The seventh lens element L7 has two aspheric surfaces, and the tenth lens element L10 has an aspheric object side surface. Further, an aperture diaphragm A is provided between the seventh lens element L7 and the eighth lens element L8.

In the zoom lens system according to Embodiment 6, the fifth lens unit G5, in order from the object side to the image side, comprises a negative meniscus twelfth lens element L12 with the convex surface facing the object side, a bi-concave thirteenth lens element L13, a bi-convex fourteenth lens element L14, and a negative meniscus fifteenth lens element L15 with the convex surface facing the object side. Among these, the thirteenth lens element L13 and the fourteenth lens element L14 are cemented with each other. The fifth lens unit G5 is a lens unit having the greatest absolute value of optical power among all the lens units, as shown in Numerical Example 6 described later.

In the zoom lens system according to Embodiment 6, the sixth lens unit G6 comprises solely a positive meniscus sixteenth lens element L16 with the convex surface facing the object side.

In the zoom lens system according to Embodiment 6, the fifth lens unit G5 corresponds to a wobbling lens unit described later, which senses a moving direction of the focusing lens units at the time of focusing by wobbling itself in a direction along the optical axis.

In the zoom lens system according to Embodiment 6, the tenth lens element L10 and the eleventh lens element L11 in the fourth lens unit G4 correspond to an image blur compensating lens unit described later, which moves in a direction perpendicular to the optical axis in order to optically compensate image blur.

In the zoom lens system according to Embodiment 6, at the time of zooming from a wide-angle limit to a telephoto limit during image taking, the second lens unit G2 and the third lens unit G3 monotonically move to the image side, and the fifth lens unit G5 moves to the object side with locus of a convex to the image side. The first lens unit G1, the fourth lens unit G4, and the sixth lens unit G6 are fixed relative to the image surface S. That is, in zooming, the second lens unit G2, the third lens unit G3, and the fifth lens unit G5 individually move along the optical axis so that the interval between the first lens unit G1 and the second lens unit G2 and the interval between the fifth lens unit G5 and the sixth lens unit G6 increase, and the interval between the third lens unit G3 and the fourth lens unit G4 and the interval between the fourth lens unit G4 and the fifth lens unit G5 decrease.

Further, in the zoom lens system according to Embodiment 6, at the time of focusing from an infinity in-focus condition to a close-object in-focus condition, the second lens unit G2 moves to the object side along the optical axis at a telephoto limit, but does not move along the optical axis in other zooming conditions. Further, at the time of focusing from the infinity in-focus condition to the close-object in-focus condition, the third lens unit G3 moves to the object side along the optical axis in all zooming conditions. Further, at the time of focusing from the infinity in-focus condition to the close-object in-focus condition, the fifth lens unit G5 does not move along the optical axis at a wide-angle limit, but moves to the image side along the optical axis in other zooming conditions.

The zoom lens systems according to Embodiments 1 to 6 are each provided with a plurality of movable lens units which individually move along the optical axis at the time of zooming from a wide-angle limit to a telephoto limit during image taking. In the zoom lens systems according to Embodiments 1 to 6, at least two of the movable lens units are focusing lens units which move along the optical axis at the time of focusing from an infinity in-focus condition to a close-object in-focus condition in at least one zooming position from a wide-angle limit to a telephoto limit, and among the focusing lens units, a lens unit having the absolute value, which is not the greatest absolute value, of a wobbling value at a wide-angle limit behaves as a wobbling lens unit which senses a moving direction of the focusing lens units at the time of focusing by wobbling itself in a direction along the optical axis.

Among the camera systems, a video camera system for image taking of videos is provided with a zoom lens system which is able to continuous high-speed autofocus. In the case that continuous autofocus is carried out at a high-speed in a zoom lens system, in general, a focusing lens unit is wobbled (wobbling action) in a direction along the optical axis at a high-speed, which results in preparation of a series of conditions, i.e., "non-focus condition" to "in-focus condition" to "non-focus condition". Then, signal elements at the frequency range where image areas partially exist are detected from output signals of an image sensor, and the most preferable position of the focusing lens unit for in-focus condition is determined. Then, the focusing lens unit is moved to the most preferable position. A series of these actions is repeated.

In the case that the wobbling action is carried out, in general, a focal length of the entire system varies due to wobbling of the focusing lens unit in a direction along the optical axis. As a result, image size corresponding to the subject, i.e., image taking magnification varies. When variation in the image taking magnification due to wobbling is great, feeling of strangeness is caused.

On the other hand, in the zoom lens systems according to Embodiments 1 to 6, among the plurality of focusing lens units, a lens unit having the absolute value, which is not the greatest absolute value, of a wobbling value at a wide-angle limit wobbles as the wobbling lens unit in a direction along the optical axis. Therefore, in the zoom lens systems according to Embodiments 1 to 6, variation in image taking magnification due to wobbling is suppressed in spite of continuous high-speed autofocusing performance, which results in no giving a user feeling of strangeness.

In the present invention, the wobbling value at a wide-angle limit is the value represented by the following expression (a).

$$W=1/e+\beta_{WO}/(Sb \times f_{WO})-1/((\beta_R \times f_R)) \quad (a)$$

where
W is a wobbling value at a wide-angle limit (wobbling incremental magnification sensitivity),
Sb is a focus sensitivity of the wobbling lens unit represented by the following expression $$Sb=(1-\beta_{WO}^2) \times \beta_R^2,$$

e is an exit pupil position of the entire system at a wide-angle limit,
$\beta_{WO}$ is a paraxial lateral magnification of the wobbling lens unit at a wide-angle limit in an infinity in-focus condition, $f_{WO}$ is a focal length of the wobbling lens unit at a wide-angle limit in an infinity in-focus condition, $\beta_R$ is a paraxial lateral magnification of a system on the image side relative to the wobbling lens unit at a wide-angle limit in an infinity in-focus condition, and $f_R$ is a focal length of a system on the image side relative to the wobbling lens unit at a wide-angle limit in an infinity in-focus condition.

In the zoom lens systems according to Embodiments 1 to 6, at the time of zooming from a wide-angle limit to a telephoto limit during image taking, the lens unit located closest to the object side, i.e., the first lens unit G1, is fixed relative to the image surface. Therefore, weight reduction of the movable lens units is achieved, and thereby actuators can be arranged inexpensively. In addition, generation of noise during zooming is suppressed. Moreover, since the overall length of lens system is not changed, a user can easily operate the lens system, and entry of dust or the like into the lens system is sufficiently prevented.

In the zoom lens systems according to Embodiments 1 to 6, at the time of zooming from a wide-angle limit to a telephoto limit during image taking, the lens unit having the aperture diaphragm, i.e., the third lens unit G3 in Embodiments 1 and 2 or the fourth lens unit G4 in Embodiments 3 to 6, is fixed relative to the image surface. Therefore, the unit including the lens unit having the aperture diaphragm which is heavy in weight is not moved, and thereby the actuators can be arranged inexpensively.

In the zoom lens systems according to Embodiments 1 to 6, at the time of zooming from a wide-angle limit to a telephoto limit during image taking, the lens unit located closest to the image side, i.e., the fifth lens unit G5 in Embodiments 1 and 2 or the sixth lens unit G6 in Embodiments 3 to 6, is fixed relative to the image surface. Therefore, entry of dust or the like into the lens system is sufficiently prevented.

In the zoom lens systems according to Embodiments 1 to 6, the lens unit located closest to the object side, i.e., the first lens unit G1, has positive optical power. Therefore, the size of the lens system is reduced. In addition, the amount of aberration caused by decentering of lens elements is reduced.

In the zoom lens systems according to Embodiments 1 to 6, at the time of focusing from an infinity in-focus condition to a close-object in-focus condition in the same zooming position from a wide-angle limit to a telephoto limit during image taking, the ratio of an amount of movement of a focusing lens unit α, which is one of the focusing lens units, to an amount of movement of a focusing lens unit β, which is one of the focusing lens units and is different from the focusing lens unit α, is constant regardless of the object distance. Therefore, focusing control is facilitated.

In the zoom lens systems according to Embodiments 1 to 4, the aperture diaphragm is included in the lens unit which is located having two air spaces toward the image side from the lens unit that is located closest to the object side, i.e., in the third lens unit G3, or the aperture diaphragm is located on the image side relative to of the third lens unit G3. Therefore, the aperture diameter is reduced, and thereby the unit size of the aperture diaphragm is reduced. In addition, since no aperture diaphragm is located on the object side relative to the third lens unit G3, the second lens unit G2 and the third lens unit G3 can be moved close to each other at a telephoto limit, and thus aberration compensation at the telephoto limit is facilitated. Furthermore, since the unit of the aperture diaphragm, which tends to have a large diameter, is located apart from the second lens unit G2, the actuator of the second lens unit G2 is easily arranged, and size reduction is achieved in the diameter direction of the lens barrel.

The zoom lens systems according to Embodiments 1 to 6 are each provided with an image blur compensating lens unit which moves in a direction perpendicular to the optical axis. The image blur compensating lens unit compensates image point movement caused by vibration of the entire system, that is, optically compensates image blur caused by hand blurring, vibration and the like.

When image point movement caused by vibration of the entire system is to be compensated, the image blur compensating lens unit moves in the direction perpendicular to the optical axis, so that image blur is compensated in a state that size increase in the entire zoom lens system is suppressed to realize a compact construction and that excellent imaging characteristics such as small decentering coma aberration and small decentering astigmatism are satisfied.

The image blur compensating lens unit according to the present invention may be a single lens unit. If a single lens unit is composed of a plurality of lens elements, the image blur compensating lens unit may be any one lens element or a plurality of adjacent lens elements among the plurality of lens elements.

The zoom lens systems according to Embodiments 1 and 2 have a five-unit construction including first to fifth lens units G1 to G5, and the zoom lens systems according to Embodiments 3 to 6 have a six-unit construction including first to sixth lens units G1 to G6. In the present invention, however, the number of lens units constituting the zoom lens system is not particularly limited so long as the zoom lens system includes a plurality of movable lens units, at least two of the movable lens units are focusing lens units, and among the focusing lens units, a lens unit having the absolute value, which is not the greatest absolute value, of a wobbling value. Further, the optical powers of the respective lens units constituting the zoom lens system are not particularly limited.

The following description is given for conditions preferred to be satisfied by a zoom lens system like the zoom lens systems according to Embodiments 1 to 6. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, in a zoom lens system like the zoom lens systems according to Embodiments 1 to 6, which includes a plurality of lens units each comprising at least one lens element, in which the plurality of lens units include a plurality of movable lens units individually moving along the optical axis at the time of zooming from a wide-angle limit to a telephoto limit during image taking, in which at least two of the movable lens units are focusing lens units which move along the optical axis at the time of focusing from an infinity in-focus condition to a close-object in-focus condition in at least one zooming position from a wide-angle limit to a telephoto limit, and in which among the focusing lens units, a lens unit having the absolute value, which is not the greatest absolute value, of a wobbling value at a wide-angle limit represented by the above-described expression (a) is a wobbling lens unit which senses a moving direction of the focusing lens units at the time of focusing by wobbling itself in a direction along the optical axis (this lens configuration is referred to as a basic configuration of the embodiments, hereinafter), the following condition (1) is preferably satisfied.

$$0.1 < T_1/f_W < 1.5 \qquad (1)$$

where
T₁ is an axial thickness of the lens unit located closest to the object side, and
$f_W$ is a focal length of the entire system at a wide-angle limit.

The condition (1) sets forth the relationship between the axial thickness of the lens unit located closest to the object side, i.e., the first lens unit, and the focal length of the entire system at the wide-angle limit. When the value goes below the lower limit of the condition (1), the optical power of the first lens unit cannot be increased, and then the size of the zoom lens system might be increased. On the other hand, when the value exceeds the upper limit of the condition (1), the thickness of the first lens unit is increased, which also might result in an increase in the size of the zoom lens system.

When at least one of the following conditions (1)' and (1)" is satisfied, the above-mentioned effect is achieved more successfully.

$$0.17 < T_1/f_W \tag{1}'$$

$$T_1/f_W < 1.20 \tag{1}''$$

For example, a zoom lens system having the basic configuration like the zoom lens systems according to Embodiments 1 to 6 preferably satisfies the following condition (2).

$$0.1 < (T_1+T_2)/f_W < 2.5 \tag{2}$$

where
T₁ is an axial thickness of the lens unit located closest to the object side,
T₂ is an axial thickness of a lens unit which is located having one air space toward the image side from the lens unit located closest to the object side, and
$f_W$ is a focal length of the entire system at a wide-angle limit.

The condition (2) sets forth the relationship between the sum of the axial thickness of the lens unit located closest to the object side, i.e., the first lens unit, and the axial thickness of the lens unit located just on the image side of the first lens unit, i.e., the second lens unit, and the focal length of the entire system at a wide-angle limit. When the value goes below the lower limit of the condition (2), the optical powers of the lens units cannot be increased, and then the size of the zoom lens system might be increased. On the other hand, when the value exceeds the upper limit of the condition (2), the thicknesses of the lens units are increased. Also in this case, the size of the zoom lens system might be increased.

When at least one of the condition (2)'-1 or (2)'-2 and the condition (2)"-1 or (2)"-2 is satisfied, the above-mentioned effect is achieved more successfully.

$$0.20 < (T_1+T_2)/f_W \tag{2)'-1}$$

$$0.25 < (T_1+T_2)/f_W \tag{2)'-2}$$

$$(T_1+T_2)/f_W < 2.0 \tag{2)''-1}$$

$$(T_1+T_2)/f_W < 1.5 \tag{2)''-2}$$

The individual lens units constituting the zoom lens systems according to Embodiments 1 to 6 are each composed exclusively of refractive type lens elements that deflect incident light by refraction (that is, lens elements of a type in which deflection is achieved at the interface between media having different refractive indices). However, the present invention is not limited to this construction. For example, the lens units may employ diffractive type lens elements that deflect incident light by diffraction; refractive-diffractive hybrid type lens elements that deflect incident light by a combination of diffraction and refraction; or gradient index type lens elements that deflect incident light by distribution of refractive index in the medium. In particular, in the refractive-diffractive hybrid type lens element, when a diffraction structure is formed in the interface between media having different refractive indices, wavelength dependence of the diffraction efficiency is improved. Thus, such a configuration is preferable.

Embodiment 7

Figure 25:
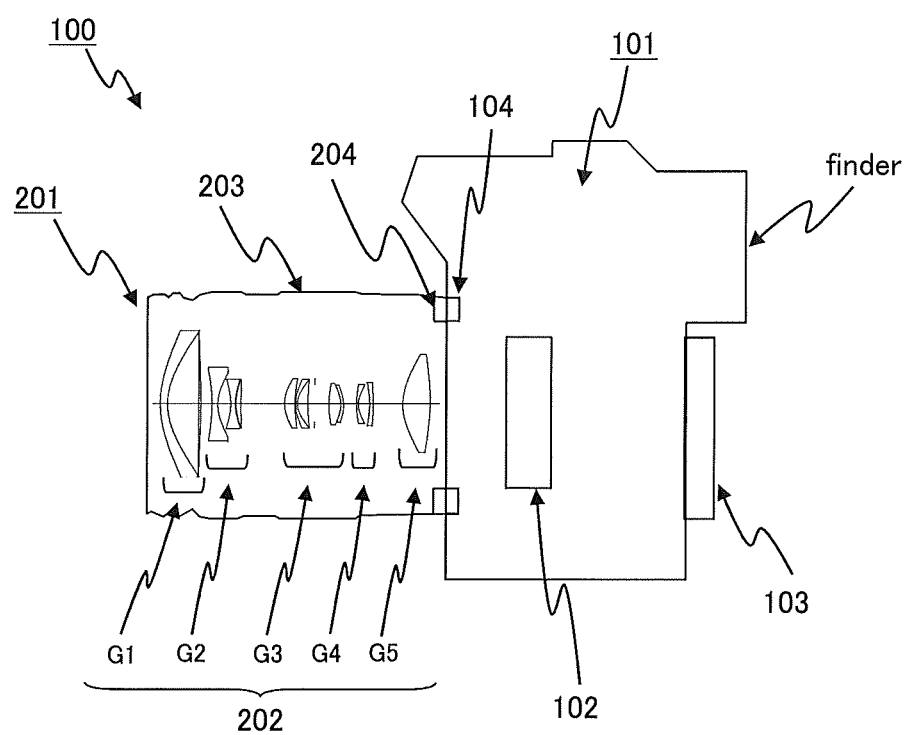
FIG. 25 is a schematic construction diagram of an interchangeable-lens type digital camera system according to Embodiment 7.

FIG. 25 is a schematic construction diagram of an interchangeable-lens type digital camera system according to Embodiment 7.

The interchangeable-lens type digital camera system 100 according to Embodiment 7 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of Embodiments 1 to 6; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 25, the zoom lens system according to Embodiment 1 is employed as the zoom lens system 202.

In Embodiment 7, since the zoom lens system 202 according to any of Embodiments 1 to 6 is employed, a compact interchangeable lens apparatus having excellent imaging performance can be realized at low cost. Moreover, size reduction and cost reduction of the entire camera system 100 according to Embodiment 7 can be achieved. In the zoom lens systems according to Embodiments 1 to 6, the entire zooming range need not be used. That is, in accordance with a desired zooming range, a range where satisfactory optical performance is obtained may exclusively be used. Then, the zoom lens system may be used as one having a lower magnification than the zoom lens systems described in Embodiments 1 to 6.

Numerical examples are described below in which the zoom lens systems according to Embodiments 1 to 6 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + \sum A_n h^n$$

Here, the symbols in the formula indicate the following quantities.
- Z is a distance from a point on an aspherical surface at a height h relative to the optical axis to a tangential plane at the vertex of the aspherical surface,
- h is a height relative to the optical axis,
- r is a radius of curvature at the top,
- κ is a conic constant, and
- An is a n-th order aspherical coefficient.

FIGS. 2, 6, 10, 14, 18, and 22 are longitudinal aberration diagrams of an infinity in-focus condition of the zoom lens systems according to Embodiments 1 to 6, respectively.

FIGS. 3, 7, 11, 15, 19, and 23 are longitudinal aberration diagrams of a close-object in-focus condition of the zoom lens systems according to Embodiments 1 to 6, respectively. In Examples 1 and 2, the object distance is 896 mm. In Examples 3 and 4, the object distance is 854 mm. In Examples 5 and 6, the object distance is 881 mm.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 4, 8, 12, 16, 20, and 24 are lateral aberration diagrams of the zoom lens systems at a telephoto limit according to Embodiments 1 to 6, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the image blur compensating lens unit (Examples 1 and 2: the tenth lens element L10 and the eleventh lens element L11 in the third lens unit G3, Examples 3 and 4: the eleventh lens element L11 and the twelfth lens element L12 in the fourth lens unit G4, Examples 5 and 6: the tenth lens element L10 and the eleventh lens element L11 in the fourth lens unit G4) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the third lens unit G3 (Examples 1 and 2) or the plane containing the optical axis of the first lens unit G1 and the optical axis of the fourth lens unit G4 (Examples 3 to 6).

In the zoom lens system according to each example, the amount of movement of the image blur compensating lens unit in a direction perpendicular to the optical axis in the image blur compensation state at a telephoto limit is as follows.

Example 1 0.234 mm
Example 2 0.264 mm
Example 3 0.500 mm
Example 4 0.500 mm
Example 5 0.500 mm
Example 6 0.500 mm When the shooting distance is infinity, at a telephoto limit, the amount of image decentering in a case that the zoom lens system inclines by 0.3° is equal to the amount of image decentering in a case that the image blur compensating lens unit displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

The zoom lens system of Numerical Example 1 corresponds to Embodiment 1 shown in FIG. 1. Table 1 shows the surface data of the zoom lens system of Numerical Example 1. Table 2 shows the aspherical data. Table 3 shows various data in an infinity in-focus condition. Table 4 shows various data in a close-object in-focus condition. Table 5 shows the wobbling values of the focusing lens units.

TABLE 1

(Surface data)

| Surface number | r | d | nd | vd |
|---|---|---|---|---|
| Object surface | ∞ | | | |
| 1 | 39.45910 | 1.20000 | 1.84666 | 23.8 |
| 2 | 25.10580 | 8.22430 | 1.72916 | 54.7 |
| 3 | 7500.52950 | 0.13520 | 1.51340 | 52.9 |
| 4* | −1133.51480 | Variable | | |
| 5 | −209.70240 | 0.90000 | 1.91082 | 35.2 |
| 6 | 12.86870 | 3.66440 | | |
| 7* | −26.10780 | 1.20000 | 1.69400 | 56.3 |
| 8 | 29.71090 | 0.15000 | | |
| 9 | 23.69790 | 2.19550 | 1.94595 | 18.0 |
| 10 | 542.52450 | Variable | | |
| 11 | 14.60210 | 2.82520 | 1.67270 | 32.2 |
| 12 | 69.38020 | 0.35860 | | |

TABLE 1-continued (Surface data)

| Surface number | r | d | nd | vd |
|---|---|---|---|---|
| 13 | 19.37730 | 0.60000 | 1.90366 | 31.3 |
| 14 | 9.13140 | 3.52070 | 1.52500 | 70.3 |
| 15* | 149.33540 | 1.68510 | | |
| 16 (Diaphragm) | ∞ | 3.50000 | | |
| 17* | 24.57900 | 3.02250 | 1.50670 | 70.5 |
| 18 | −13.43620 | 0.50000 | 1.80518 | 25.5 |
| 19 | −20.61450 | Variable | | |
| 20 | 29.28480 | 0.60000 | 1.83481 | 42.7 |
| 21 | 11.74650 | 1.60420 | | |
| 22 | −28.70330 | 0.60000 | 1.61800 | 63.4 |
| 23 | 170.95130 | Variable | | |
| 24 | 21.32440 | 6.55150 | 1.52500 | 70.3 |
| 25* | −48.46490 | (BF) | | |
| Image surface | ∞ | | | |

TABLE 2

(Aspherical data)

Surface No. 4

$K = 0.00000E+00, A4 = 1.66434E-06, A6 = -6.25080E-10,$
$A8 = -8.58592E-13\ A10 = 2.10796E-15$

Surface No. 7

$K = 0.00000E+00, A4 = 1.23343E-05, A6 = -2.55507E-08,$
$A8 = 0.00000E+00\ A10 = 0.00000E+00$

Surface No. 15

$K = 0.00000E+00, A4 = 5.72394E-05, A6 = 1.91936E-07,$
$A8 = 0.00000E+00\ A10 = 0.00000E+00$

Surface No. 17

$K = 0.00000E+00, A4 = -2.70227E-05, A6 = 8.68997E-08,$
$A8 = 0.00000E+00\ A10 = 0.00000E+00$

Surface No. 25

$K = 0.00000E+00, A4 = 2.87186E-05, A6 = -2.31449E-08,$
$A8 = 0.00000E+00\ A10 = 0.00000E+00$

TABLE 3

(Various data in an infinity in-focus condition)

Zooming ratio 4.70869

| | Wide-angle limit | Middle position | Telephoto limit |
|---|---|---|---|
| Focal length | 17.5100 | 37.9858 | 82.4491 |
| F-number | 3.60539 | 5.15110 | 5.76896 |
| View angle | 35.0441 | 15.6249 | 7.1321 |
| Image height | 10.8150 | 10.8150 | 10.8150 |
| Overall length of lens system | 102.57 | 102.57 | 102.57 |
| BF | 14.95 | 14.95 | 14.95 |
| d4 | 1.1575 | 14.4071 | 24.3763 |
| d10 | 24.2188 | 10.9692 | 1.0000 |
| d19 | 3.1000 | 7.6464 | 13.7120 |
| d23 | 16.1054 | 11.5590 | 5.4934 |

Zoom lens unit data

| Lens unit | Initial surface No. | Focal length |
|---|---|---|
| 1 | 1 | 58.05428 |
| 2 | 5 | −11.29703 |
| 3 | 11 | 16.80424 |
| 4 | 20 | −14.57985 |
| 5 | 24 | 29.14870 |

TABLE 4

(Various data in a close-object in-focus condition)

Zooming ratio 3.48510

| | Wide-angle limit | Middle position | Telephoto limit |
|---|---|---|---|
| Object distance | 896.0000 | 896.0000 | 896.0000 |
| Focal length | 17.5193 | 31.0704 | 61.0564 |
| F-number | 3.61754 | 5.02920 | 5.71191 |
| View angle | 34.9294 | 19.0037 | 9.0365 |
| Image height | 10.8150 | 10.8150 | 10.8150 |
| Overall length of lens system | 102.57 | 102.57 | 102.57 |
| BF | 14.95 | 14.95 | 14.95 |
| d4 | 1.1575 | 11.4071 | 21.3764 |
| d10 | 24.2188 | 13.9692 | 4.0000 |
| d19 | 3.1781 | 6.5689 | 12.9874 |
| d23 | 16.0273 | 12.6365 | 6.2181 |

Zoom lens unit data

| Lens unit | Initial surface No. | Focal length |
|---|---|---|
| 1 | 1 | 58.05428 |
| 2 | 5 | −11.29703 |
| 3 | 11 | 16.80424 |
| 4 | 20 | −14.57985 |
| 5 | 24 | 29.14870 |

TABLE 5

(Wobbling values)

| | Second lens unit | Fourth lens unit |
|---|---|---|
| W | 0.042 | −0.007 |
| Sb | 1.010 | −4.290 |
| e | −175.445 | −175.445 |
| $\beta_{WO}$ | −0.287 | 5.523 |
| $f_{WO}$ | −11.297 | −14.580 |
| $\beta_R$ | −1.049 | 0.381 |
| $f_R$ | 42.619 | 29.149 |

Numerical Example 2

The zoom lens system of Numerical Example 2 corresponds to Embodiment 2 shown in FIG. 5. Table 6 shows the surface data of the zoom lens system of Numerical Example 2. Table 7 shows the aspherical data. Table 8 shows various data in an infinity in-focus condition. Table 9 shows various data in a close-object in-focus condition. Table 10 shows the wobbling values of the focusing lens units.

TABLE 6

(Surface data)

| Surface number | r | d | nd | vd |
|---|---|---|---|---|
| Object surface | ∞ | | | |
| 1 | 40.55390 | 1.20000 | 1.84666 | 23.8 |
| 2 | 25.48970 | 7.82810 | 1.72916 | 54.7 |
| 3 | −1060.14520 | 0.13160 | 1.51340 | 52.9 |
| 4* | −518.58960 | Variable | | |
| 5 | −129.07510 | 0.90000 | 1.91082 | 35.2 |
| 6 | 13.78230 | 3.43320 | | |
| 7* | −26.13710 | 1.20000 | 1.69400 | 56.3 |
| 8 | 30.86700 | 0.15000 | | |
| 9 | 24.83930 | 2.15460 | 1.94595 | 18.0 |
| 10 | 2103.46990 | Variable | | |

TABLE 6-continued (Surface data)

| Surface number | r | d | nd | vd |
|---|---|---|---|---|
| 11 | 14.42110 | 2.90810 | 1.67270 | 32.2 |
| 12 | 58.13430 | 0.23740 | | |
| 13 | 18.93180 | 0.60000 | 1.90366 | 31.3 |
| 14 | 8.97480 | 3.83440 | 1.52500 | 70.3 |
| 15* | 486.06320 | 1.61730 | | |
| 16 (Diaphragm) | ∞ | 3.50000 | | |
| 17* | 25.82680 | 2.96730 | 1.50670 | 70.5 |
| 18 | −14.81600 | 0.50000 | 1.80518 | 25.5 |
| 19 | −22.70770 | Variable | | |
| 20 | 28.94460 | 0.60000 | 1.83481 | 42.7 |
| 21 | 11.73350 | 1.61060 | | |
| 22 | −32.94690 | 0.60000 | 1.61800 | 63.4 |
| 23 | 94.79190 | Variable | | |
| 24 | 21.50100 | 6.42320 | 1.52500 | 70.3 |
| 25* | −53.44240 | (BF) | | |
| Image surface | ∞ | | | |

TABLE 7

(Aspherical data)

Surface No. 4

K = 0.00000E+00, A4 = 1.69282E−06, A6 = −6.45222E−10,
A8 = −7.25840E−13 A10 = 1.66047E−15

Surface No. 7

K = 0.00000E+00, A4 = 1.13469E−05, A6 = −1.45516E−08,
A8 = 0.00000E+00 A10 = 0.00000E+00

Surface No. 15

K = 0.00000E+00, A4 = 5.67011E−05, A6 = 1.26088E−07,
A8 = 0.00000E+00 A10 = 0.00000E+00

Surface No. 17

K = 0.00000E+00, A4 = −2.30451E−05, A6 = 6.87297E−08,
A8 = 0.00000E+00 A10 = 0.00000E+00

Surface No. 25

K = 0.00000E+00, A4 = 2.52997E−05, A6 = −2.17080E−08,
A8 = 0.00000E+00 A10 = 0.00000E+00

TABLE 8

(Various data in an infinity in-focus condition)

Zooming ratio 4.70878

| | Wide-angle limit | Middle position | Telephoto limit |
|---|---|---|---|
| Focal length | 18.5399 | 40.2212 | 87.3004 |
| F-number | 3.60532 | 5.15004 | 5.76901 |
| View angle | 33.5303 | 14.7707 | 6.7396 |
| Image height | 10.8150 | 10.8150 | 10.8150 |
| Overall length of lens system | 102.57 | 102.57 | 102.57 |
| BF | 14.95 | 14.95 | 14.95 |
| d4 | 1.2101 | 14.5172 | 24.6148 |
| d10 | 24.4044 | 11.0972 | 1.0000 |
| d19 | 3.1000 | 7.5654 | 13.0748 |
| d23 | 16.5086 | 12.0435 | 6.5339 |

Zoom lens unit data

| Lens unit | Initial surface No. | Focal length |
|---|---|---|
| 1 | 1 | 57.41235 |
| 2 | 5 | −11.65482 |
| 3 | 11 | 16.91533 |
| 4 | 20 | −14.59491 |
| 5 | 24 | 30.09227 |

TABLE 9

(Various data in a close-object in-focus condition)

Zooming ratio 3.47845

| | Wide-angle limit | Middle position | Telephoto limit |
|---|---|---|---|
| Object distance | 896.0000 | 896.0000 | 896.0000 |
| Focal length | 18.5448 | 32.9026 | 64.5072 |
| F-number | 3.61839 | 5.03658 | 5.74812 |
| View angle | 33.4016 | 17.9643 | 8.4812 |
| Image height | 10.8150 | 10.8150 | 10.8150 |
| Overall length of lens system | 102.57 | 102.57 | 102.57 |
| BF | 14.95 | 14.95 | 14.95 |
| d4 | 1.2101 | 11.5172 | 21.6149 |
| d10 | 24.4045 | 14.0972 | 4.0000 |
| d19 | 3.1837 | 6.5548 | 12.7824 |
| d23 | 16.4249 | 13.0542 | 6.8264 |

Zoom lens unit data

| Lens unit | Initial surface No. | Focal length |
|---|---|---|
| 1 | 1 | 57.41235 |
| 2 | 5 | −11.65482 |
| 3 | 11 | 16.91533 |
| 4 | 20 | −14.59491 |
| 5 | 24 | 30.09227 |

TABLE 10

(Wobbling values)

| | Second lens unit | Fourth lens unit |
|---|---|---|
| W | 0.040 | −0.007 |
| Sb | 1.049 | −4.488 |
| e | −156.903 | −156.903 |
| $\beta_{WO}$ | −0.301 | 5.385 |
| $f_{WO}$ | −11.655 | −14.595 |
| $\beta_R$ | −1.074 | 0.400 |
| $f_R$ | 42.498 | 30.092 |

Numerical Example 3

The zoom lens system of Numerical Example 3 corresponds to Embodiment 3 shown in FIG. 9. Table 11 shows the surface data of the zoom lens system of Numerical Example 3. Table 12 shows the aspherical data. Table 13 shows various data in an infinity in-focus condition. Table 14 shows various data in a close-object in-focus condition. Table 15 shows the wobbling values of the focusing lens units.

TABLE 11

(Surface data)

| Surface number | r | d | nd | vd |
|---|---|---|---|---|
| Object surface | ∞ | | | |
| 1 | 78.87740 | 1.50000 | 1.84666 | 23.8 |
| 2 | 51.11990 | 8.20570 | 1.49700 | 81.6 |
| 3 | −309.84050 | 0.15000 | | |
| 4 | 46.93030 | 4.87270 | 1.61800 | 63.4 |

TABLE 11-continued (Surface data)

| Surface number | r | d | nd | vd |
|---|---|---|---|---|
| 5 | 153.26660 | Variable | | |
| 6* | −78.16680 | 0.30000 | 1.51340 | 52.9 |
| 7 | −69.05600 | 1.05000 | 1.88300 | 40.8 |
| 8 | 14.60860 | 4.08700 | | |
| 9 | −26.25860 | 0.80000 | 1.72916 | 54.7 |
| 10 | 54.96670 | 0.15000 | | |
| 11 | 32.57540 | 2.29090 | 1.94595 | 18.0 |
| 12 | −229.68230 | Variable | | |
| 13* | 17.10270 | 3.86620 | 1.68893 | 31.1 |
| 14* | −252.13690 | 1.83550 | | |
| 15 | 78.94860 | 0.80000 | 1.85014 | 30.1 |
| 16 | 11.50760 | 4.28010 | 1.49700 | 81.6 |
| 17 | −128.66160 | Variable | | |
| 18 (Diaphragm) | ∞ | 3.50000 | | |
| 19* | 31.40570 | 3.09850 | 1.55332 | 71.7 |
| 20 | −22.99450 | 0.60000 | 1.80518 | 25.5 |
| 21 | −38.08840 | Variable | | |
| 22 | 23.56040 | 0.60000 | 1.83481 | 42.7 |
| 23 | 12.02380 | 2.64670 | | |
| 24 | −15.50110 | 0.60000 | 1.80420 | 46.5 |
| 25 | 309.52360 | 2.10930 | 1.78472 | 25.7 |
| 26 | −40.59840 | 0.15000 | | |
| 27* | 40.41630 | 3.01540 | 1.53110 | 56.0 |
| 28* | −46.21370 | Variable | | |
| 29* | 21.44480 | 4.84830 | 1.50670 | 70.5 |
| 30* | 186.74310 | (BF) | | |
| Image surface | ∞ | | | |

TABLE 12

(Aspherical data)

Surface No. 6

K = 0.00000E+00, A4 = 1.93253E−05, A6 = −3.16908E−08, A8 = −6.40929E−10 A10 = 3.54689E−12, A12 = 2.66112E−24, A14 = −2.02843E−28
Surface No. 13

K = 0.00000E+00, A4 = −9.80366E−06, A6 = 1.05306E−08, A8 = 0.00000E+00 A10 = 0.00000E+00, A12 = 0.00000E+00, A14 = 0.00000E+00
Surface No. 14

K = 0.00000E+00, A4 = 1.02788E−05, A6 = 1.48632E−08, A8 = 0.00000E+00 A10 = 0.00000E+00, A12 = 0.00000E+00, A14 = 0.00000E+00
Surface No. 19

K = 0.00000E+00, A4 = −8.80224E−06, A6 = 3.58312E−08, A8 = −8.16452E−10 A10 = 1.02445E−11, A12 = 0.00000E+00, A14 = 0.00000E+00
Surface No. 27

K = 0.00000E+00, A4 = 4.18434E−05, A6 = 1.14558E−08, A8 = 0.00000E+00 A10 = 0.00000E+00, A12 = 0.00000E+00, A14 = 0.00000E+00
Surface No. 28

K = 0.00000E+00, A4 = 1.29529E−05, A6 = 1.47395E−07, A8 = 0.00000E+00 A10 = 0.00000E+00, A12 = 0.00000E+00, A14 = 0.00000E+00
Surface No. 29

K = 0.00000E+00, A4 = 9.80214E−06, A6 = −1.00950E−08, A8 = 0.00000E+00 A10 = 0.00000E+00, A12 = 0.00000E+00, A14 = 0.00000E+00
Surface No. 30

K = 0.00000E+00, A4 = 3.88774E−05, A6 = −6.79912E−08, A8 = 0.00000E+00 A10 = 0.00000E+00, A12 = 0.00000E+00, A14 = 0.00000E+00

TABLE 13

(Various data in an infinity in-focus condition)

Zooming ratio 9.41751

| | Wide-angle limit | Middle position | Telephoto limit |
|---|---|---|---|
| Focal length | 17.5100 | 53.7443 | 164.9003 |
| F-number | 3.60518 | 4.94428 | 5.76897 |
| View angle | 35.0198 | 11.2522 | 3.6840 |
| Image height | 10.8150 | 10.8150 | 10.8150 |
| Overall length of lens system | 144.57 | 144.57 | 144.57 |
| BF | 15.97 | 15.97 | 15.97 |
| d5 | 1.8950 | 21.0124 | 39.8115 |
| d12 | 38.9163 | 12.8343 | 1.0000 |
| d17 | 1.5000 | 8.4646 | 1.5000 |
| d21 | 3.1000 | 16.7748 | 18.8282 |
| d28 | 27.8290 | 14.1542 | 12.1008 |

Zoom lens unit data

| Lens unit | Initial surface No. | Focal length |
|---|---|---|
| 1 | 1 | 68.57962 |
| 2 | 6 | −12.33387 |
| 3 | 13 | 33.61459 |
| 4 | 18 | 36.49963 |
| 5 | 22 | −28.99628 |
| 6 | 29 | 47.34650 |

TABLE 14

(Various data in a close-object in-focus condition)

Zooming ratio 6.41282

| | Wide-angle limit | Middle position | Telephoto limit |
|---|---|---|---|
| Object distance | 854.0000 | 854.0000 | 854.0000 |
| Focal length | 17.5336 | 50.2145 | 112.4397 |
| F-number | 3.61553 | 4.94320 | 6.06912 |
| View angle | 34.9399 | 11.8981 | 4.5970 |
| Image height | 10.8150 | 10.8150 | 10.8150 |
| Overall length of lens system | 144.57 | 144.57 | 144.57 |
| BF | 15.97 | 15.97 | 15.97 |
| d5 | 1.8951 | 19.9184 | 36.8115 |
| d12 | 38.9164 | 13.9284 | 4.0000 |
| d17 | 1.5000 | 8.4647 | 1.5000 |
| d21 | 3.1949 | 16.7287 | 27.3460 |
| d28 | 27.7342 | 14.2004 | 3.5831 |

Zoom lens unit data

| Lens unit | Initial surface No. | Focal length |
|---|---|---|
| 1 | 1 | 68.57962 |
| 2 | 6 | −12.33387 |
| 3 | 13 | 33.61459 |
| 4 | 18 | 36.49963 |
| 5 | 22 | −28.99628 |
| 6 | 29 | 47.34650 |

TABLE 15

(Wobbling values)

| | Second lens unit | Fifth lens unit |
|---|---|---|
| W | 0.037 | −0.006 |
| Sb | 0.908 | −3.669 |
| e | −456.920 | −456.920 |

TABLE 15-continued (Wobbling values)

|  | Second lens unit | Fifth lens unit |
|---|---|---|
| $\beta_{WO}$ | −0.259 | 3.415 |
| $f_{WO}$ | −12.334 | −28.996 |
| $\beta_R$ | −0.986 | 0.587 |
| $f_R$ | 63.195 | 47.347 |

Numerical Example 4

The zoom lens system of Numerical Example 4 corresponds to Embodiment 4 shown in FIG. 13. Table 16 shows the surface data of the zoom lens system of Numerical Example 4. Table 17 shows the aspherical data. Table 18 shows various data in an infinity in-focus condition. Table 19 shows various data in a close-object in-focus condition. Table 20 shows the wobbling values of the focusing lens units.

TABLE 16

(Surface data)

| Surface number | r | d | nd | vd |
|---|---|---|---|---|
| Object surface | ∞ | | | |
| 1 | 80.66730 | 1.50000 | 1.84666 | 23.8 |
| 2 | 51.57030 | 8.08300 | 1.49700 | 81.6 |
| 3 | −254.93460 | 0.15000 | | |
| 4 | 46.40960 | 4.73840 | 1.61800 | 63.4 |
| 5 | 147.94490 | Variable | | |
| 6* | −61.74060 | 0.16590 | 1.51340 | 52.9 |
| 7 | −67.23540 | 1.05000 | 1.88300 | 40.8 |
| 8 | 15.08380 | 3.79040 | | |
| 9 | −28.20550 | 0.80000 | 1.72916 | 54.7 |
| 10 | 52.89490 | 0.15000 | | |
| 11 | 31.91530 | 2.23780 | 1.94595 | 18.0 |
| 12 | −283.71470 | Variable | | |
| 13* | 17.02280 | 4.13050 | 1.68893 | 31.1 |
| 14* | −191.74470 | 1.62030 | | |
| 15 | 93.51080 | 0.80000 | 1.85014 | 30.1 |
| 16 | 11.59390 | 4.42820 | 1.49700 | 81.6 |
| 17 | −197.24180 | Variable | | |
| 18 (Diaphragm) | ∞ | 3.50000 | | |
| 19* | 30.50180 | 3.32490 | 1.55332 | 71.7 |
| 20 | −22.22060 | 0.60000 | 1.80518 | 25.5 |
| 21 | −35.74340 | Variable | | |
| 22 | 20.94320 | 0.60000 | 1.83481 | 42.7 |
| 23 | 11.50220 | 2.38050 | | |
| 24 | −17.48170 | 0.60000 | 1.80420 | 46.5 |
| 25 | 67.94060 | 2.07030 | 1.78472 | 25.7 |
| 26 | −61.03680 | 0.15000 | | |
| 27* | 32.85520 | 2.74360 | 1.53110 | 56.0 |
| 28* | −60.74640 | Variable | | |
| 29* | 20.26020 | 4.64810 | 1.50670 | 70.5 |
| 30* | 85.35460 | (BF) | | |
| Image surface | ∞ | | | |

TABLE 17

(Aspherical data)

Surface No. 6

K = 0.00000E+00, A4 = 2.18078E−05, A6 = −3.13170E−08,
A8 = −6.88758E−10 A10 = 4.10811E−12, A12 = 1.05938E−24,
A14 = −2.47656E−28
Surface No. 13

K = 0.00000E+00, A4 = −1.01072E−05, A6 = 6.12657E−09,
A8 = 0.00000E+00 A10 = 0.00000E+00, A12 = 0.00000E+00,
A14 = 0.00000E+00
Surface No. 14

K = 0.00000E+00, A4 = 1.09110E−05, A6 = 1.19433E−08,
A8 = 0.00000E+00 A10 = 0.00000E+00, A12 = 0.00000E+00,
A14 = 0.00000E+00

TABLE 17-continued (Aspherical data)

Surface No. 19

K = 0.00000E+00, A4 = −1.02373E−05, A6 = 2.38152E−08,
A8 = −5.10196E−10 A10 = 6.20653E−12, A12 = 0.00000E+00,
A14 = 0.00000E+00
Surface No. 27

K = 0.00000E+00, A4 = 4.15374E−05, A6 = 2.80506E−08,
A8 = 0.00000E+00 A10 = 0.00000E+00, A12 = 0.00000E+00,
A14 = 0.00000E+00
Surface No. 28

K = 0.00000E+00, A4 = 1.67525E−05, A6 = 1.54487E−07,
A8 = 0.00000E+00 A10 = 0.00000E+00, A12 = 0.00000E+00,
A14 = 0.00000E+00
Surface No. 29

K = 0.00000E+00, A4 = 3.95211E−06, A6 = −4.51318E−09,
A8 = 0.00000E+00 A10 = 0.00000E+00, A12 = 0.00000E+00,
A14 = 0.00000E+00
Surface No. 30

K = 0.00000E+00, A4 = 2.86326E−05, A6 = −4.15745E−08,
A8 = 0.00000E+00 A10 = 0.00000E+00, A12 = 0.00000E+00,
A14 = 0.00000E+00

TABLE 18

(Various data in an infinity in-focus condition)

Zooming ratio 9.41742

| | Wide-angle limit | Middle position | Telephoto limit |
|---|---|---|---|
| Focal length | 18.5399 | 56.9050 | 174.5984 |
| F-number | 3.60533 | 4.94419 | 5.76838 |
| View angle | 33.4659 | 10.7418 | 3.4958 |
| Image height | 10.8150 | 10.8150 | 10.8150 |
| Overall length of lens system | 144.57 | 144.57 | 144.57 |
| BF | 16.24 | 16.24 | 16.24 |
| d5 | 1.9870 | 21.0846 | 39.9552 |
| d12 | 38.9682 | 12.2305 | 1.0000 |
| d17 | 1.5000 | 9.1399 | 1.5000 |
| d21 | 3.1000 | 17.1421 | 16.1241 |
| d28 | 28.5066 | 14.4644 | 15.4825 |

Zoom lens unit data

| Lens unit | Initial surface No. | Focal length |
|---|---|---|
| 1 | 1 | 67.74704 |
| 2 | 6 | −12.57199 |
| 3 | 13 | 35.11067 |
| 4 | 18 | 34.66952 |
| 5 | 22 | −28.32513 |
| 6 | 29 | 51.20047 |

TABLE 19

(Various data in a close-object in-focus condition)

Zooming ratio 6.25719

| | Wide-angle limit | Middle position | Telephoto limit |
|---|---|---|---|
| Object distance | 854.0000 | 854.0000 | 854.0000 |
| Focal length | 18.5509 | 53.9950 | 116.0766 |
| F-number | 3.61566 | 4.96838 | 6.14730 |
| View angle | 33.3816 | 11.0806 | 4.3346 |

TABLE 19-continued (Various data in a close-object in-focus condition)

| Image height | 10.8150 | 10.8150 | 10.8150 |
|---|---|---|---|
| Overall length of lens system | 144.57 | 144.57 | 144.57 |
| BF | 16.24 | 16.24 | 16.24 |
| d5 | 1.9870 | 20.4390 | 36.9552 |
| d12 | 38.9682 | 12.8763 | 4.0000 |
| d17 | 1.5000 | 9.1400 | 1.5000 |
| d21 | 3.1991 | 17.6814 | 25.4980 |
| d28 | 28.4076 | 13.9252 | 6.1087 |

Zoom lens unit data

| Lens unit | Initial surface No. | Focal length |
|---|---|---|
| 1 | 1 | 67.74704 |
| 2 | 6 | −12.57199 |
| 3 | 13 | 35.11067 |
| 4 | 18 | 34.66952 |
| 5 | 22 | −28.32513 |
| 6 | 29 | 51.20047 |

TABLE 20

(Wobbling values)

| | Second lens unit | Fifth lens unit |
|---|---|---|
| W | 0.034 | −0.006 |
| Sb | 0.983 | −3.957 |
| e | −248.860 | −248.860 |
| $\beta_{WO}$ | −0.265 | 3.441 |
| $f_{WO}$ | −12.489 | −27.975 |
| $\beta_R$ | −1.028 | 0.604 |
| $f_R$ | 59.093 | 50.557 |

Numerical Example 5

The zoom lens system of Numerical Example 5 corresponds to Embodiment 5 shown in FIG. 17. Table 21 shows the surface data of the zoom lens system of Numerical Example 5. Table 22 shows the aspherical data. Table 23 shows various data in an infinity in-focus condition. Table 24 shows various data in a close-object in-focus condition. Table 25 shows the wobbling values of the focusing lens units.

TABLE 21

(Surface data)

| Surface number | r | d | nd | vd |
|---|---|---|---|---|
| Object surface | ∞ | | | |
| 1 | 65.21560 | 1.00000 | 1.80518 | 25.5 |
| 2 | 41.84900 | 4.84220 | 1.49700 | 81.6 |
| 3 | −451.34910 | 0.15000 | | |
| 4 | 57.85360 | 3.24840 | 1.48749 | 70.4 |
| 5 | −1298.88820 | Variable | | |
| 6 | 481.12200 | 0.90000 | 1.80610 | 33.3 |
| 7 | 15.60560 | 2.18600 | 1.94595 | 18.0 |
| 8 | 29.53610 | Variable | | |
| 9 | −32.91280 | 0.70000 | 1.62041 | 60.3 |
| 10 | 255.13910 | Variable | | |
| 11* | 18.98460 | 4.02200 | 1.71430 | 38.9 |
| 12* | −263.25160 | 1.50000 | | |
| 13 (Diaphragm) | ∞ | 1.52740 | | |
| 14 | 107.14480 | 0.80000 | 1.90366 | 31.3 |
| 15 | 13.42810 | 3.84880 | 1.49700 | 81.6 |
| 16 | 292.33830 | 6.96070 | | |
| 17* | 23.39070 | 3.84370 | 1.50670 | 70.5 |
| 18 | −26.00110 | 0.80000 | 1.80518 | 25.5 |
| 19 | −34.28350 | Variable | | |
| 20 | 20.57160 | 0.60000 | 1.83481 | 42.7 |
| 21 | 13.05790 | 3.11080 | | |
| 22 | −28.40360 | 0.60000 | 1.77250 | 49.6 |
| 23 | 26.05890 | 2.94320 | 1.76182 | 26.6 |
| 24 | −32.80830 | 0.15000 | | |
| 25 | 50.24770 | 0.76850 | 1.77250 | 49.6 |
| 26 | 18.16860 | Variable | | |
| 27 | 17.31000 | 3.18310 | 1.51680 | 64.2 |
| 28 | 28.28370 | (BF) | | |
| Image surface | ∞ | | | |

TABLE 22

(Aspherical data)

Surface No. 11

K = 0.00000E+00, A4 = −9.65644E−06, A6 = −8.20710E−09
Surface No. 12

K = 0.00000E+00, A4 = 3.90372E−06, A6 = 1.18015E−08
Surface No. 17

K = 0.00000E+00, A4 = −2.08147E−05, A6 = 2.47893E−10

TABLE 23

(Various data in an infinity in-focus condition)

Zooming ratio 3.55770

| | Wide-angle limit | Middle position | Telephoto limit |
|---|---|---|---|
| Focal length | 46.3504 | 82.4158 | 164.9008 |
| F-number | 4.12011 | 5.25328 | 5.76839 |
| View angle | 13.4481 | 7.3994 | 3.7506 |
| Image height | 10.8150 | 10.8150 | 10.8150 |
| Overall length of lens system | 117.57 | 117.57 | 117.57 |
| BF | 17.09 | 17.09 | 17.09 |
| d5 | 1.0000 | 15.3477 | 30.7796 |
| d8 | 5.4738 | 5.1228 | 3.3464 |
| d10 | 28.6522 | 14.6555 | 1.0000 |
| d19 | 8.2124 | 9.5058 | 3.2294 |
| d26 | 9.4521 | 8.1587 | 14.4352 |

Zoom lens unit data

| Lens unit | Initial surface No. | Focal length |
|---|---|---|
| 1 | 1 | 68.08928 |
| 2 | 6 | −47.64541 |
| 3 | 9 | −46.94498 |
| 4 | 11 | 25.26489 |
| 5 | 20 | −17.71059 |
| 6 | 27 | 78.56489 |

TABLE 24

(Various data in a close-object in-focus condition)

Zooming ratio 2.34663

| | Wide-angle limit | Middle position | Telephoto limit |
|---|---|---|---|
| Object distance | 881.0000 | 881.0000 | 881.0000 |
| Focal length | 43.5533 | 70.2366 | 102.2032 |
| F-number | 4.12056 | 5.25788 | 5.90257 |
| View angle | 13.7358 | 7.5863 | 4.0601 |

TABLE 24-continued (Various data in a close-object in-focus condition)

| | | | |
|---|---|---|---|
| Image height | 10.8150 | 10.8150 | 10.8150 |
| Overall length of lens system | 117.57 | 117.57 | 117.57 |
| BF | 17.09 | 17.09 | 17.09 |
| d5 | 1.0000 | 15.3474 | 28.1396 |
| d8 | 3.4900 | 3.3539 | 3.9955 |
| d10 | 30.6362 | 16.4249 | 2.9911 |
| d19 | 8.2124 | 10.4467 | 9.7035 |
| d26 | 9.4521 | 7.2179 | 7.9611 |

Zoom lens unit data

| Lens unit | Initial surface No. | Focal length |
|---|---|---|
| 1 | 1 | 68.08928 |
| 2 | 6 | −47.64541 |
| 3 | 9 | −46.94498 |
| 4 | 11 | 25.26489 |
| 5 | 20 | −17.71059 |
| 6 | 27 | 78.56489 |

TABLE 25

(Wobbling values)

| | Second lens unit | Third lens unit | Fifth lens unit |
|---|---|---|---|
| W | −0.072 | −0.002 | −0.010 |
| Sb | −0.427 | 1.167 | −4.980 |
| e | −33.760 | −33.760 | −33.760 |
| $\beta_{WO}$ | −3.550 | 0.175 | 3.258 |
| $f_{WO}$ | −47.645 | −46.945 | −17.711 |
| $\beta_R$ | −0.192 | −1.097 | 0.720 |
| $f_R$ | 39.392 | 29.252 | 78.565 |

Numerical Example 6

The zoom lens system of Numerical Example 6 corresponds to Embodiment 6 shown in FIG. 21. Table 26 shows the surface data of the zoom lens system of Numerical Example 6. Table 27 shows the aspherical data. Table 28 shows various data in an infinity in-focus condition. Table 29 shows various data in a close-object in-focus condition. Table 30 shows the wobbling values of the focusing lens units.

TABLE 26

(Surface data)

| Surface number | r | d | nd | vd |
|---|---|---|---|---|
| Object surface | ∞ | | | |
| 1 | 65.87180 | 1.00000 | 1.80518 | 25.5 |
| 2 | 42.07600 | 5.00710 | 1.49700 | 81.6 |
| 3 | −430.79570 | 0.15000 | | |
| 4 | 56.94370 | 3.36930 | 1.48749 | 70.4 |
| 5 | −1501.25820 | Variable | | |
| 6 | 480.89860 | 0.90000 | 1.80610 | 33.3 |
| 7 | 15.47020 | 2.19580 | 1.94595 | 18.0 |
| 8 | 29.19040 | Variable | | |
| 9 | −32.69450 | 0.70000 | 1.62041 | 60.3 |
| 10 | 268.83430 | Variable | | |
| 11* | 18.86130 | 4.10110 | 1.71430 | 38.9 |
| 12* | −243.25930 | 1.50000 | | |
| 13 (Diaphragm) | ∞ | 1.51790 | | |
| 14 | 114.11090 | 0.80000 | 1.90366 | 31.3 |
| 15 | 13.42020 | 3.84040 | 1.49700 | 81.6 |
| 16 | 207.04920 | 6.59470 | | |
| 17* | 22.87250 | 3.86940 | 1.50670 | 70.5 |
| 18 | −25.57270 | 0.80000 | 1.80518 | 25.5 |
| 19 | −33.55200 | Variable | | |

TABLE 26-continued (Surface data)

| Surface number | r | d | nd | vd |
|---|---|---|---|---|
| 20 | 20.87580 | 0.60000 | 1.83481 | 42.7 |
| 21 | 12.74870 | 3.64520 | | |
| 22 | −35.33730 | 0.60000 | 1.77250 | 49.6 |
| 23 | 19.85570 | 2.99650 | 1.76182 | 26.6 |
| 24 | −45.88440 | 0.15000 | | |
| 25 | 50.65750 | 0.81490 | 1.77250 | 49.6 |
| 26 | 18.87760 | Variable | | |
| 27 | 17.47880 | 3.19950 | 1.51680 | 64.2 |
| 28 | 29.69520 | (BF) | | |
| Image surface | ∞ | | | |

TABLE 27

(Aspherical data)

Surface No. 11

K = 0.00000E+00, A4 = −1.03291E−05, A6 = −1.03820E−08

Surface No. 12

K = 0.00000E+00, A4 = 3.42299E−06, A6 = 1.28109E−08

Surface No. 17

K = 0.00000E+00, A4 = −2.26941E−05, A6 = 6.90506E−10

TABLE 28

(Various data in an infinity in-focus condition)

Zooming ratio 3.66234

| | Wide-angle limit | Middle position | Telephoto limit |
|---|---|---|---|
| Focal length | 46.3493 | 88.6883 | 169.7469 |
| F-number | 4.12022 | 5.25319 | 5.76810 |
| View angle | 13.4101 | 6.8484 | 3.6392 |
| Image height | 10.8150 | 10.8150 | 10.8150 |
| Overall length of lens system | 117.57 | 117.57 | 117.57 |
| BF | 16.96 | 16.96 | 16.96 |
| d5 | 1.0000 | 16.8403 | 31.1023 |
| d8 | 5.3504 | 5.2090 | 3.3881 |
| d10 | 29.1399 | 13.4410 | 1.0000 |
| d19 | 8.3176 | 9.5926 | 3.1000 |
| d26 | 8.4469 | 7.1719 | 13.6646 |

Zoom lens unit data

| Lens unit | Initial surface No. | Focal length |
|---|---|---|
| 1 | 1 | 67.86546 |
| 2 | 6 | −46.99459 |
| 3 | 9 | −46.94255 |
| 4 | 11 | 25.09520 |
| 5 | 20 | −16.73602 |
| 6 | 27 | 75.47658 |

TABLE 29

(Various data in a close-object in-focus condition)

Zooming ratio 2.32997

| | Wide-angle limit | Middle position | Telephoto limit |
|---|---|---|---|
| Object distance | 881.0000 | 881.0000 | 881.0000 |
| Focal length | 43.5025 | 73.5782 | 101.3595 |
| F-number | 4.12068 | 5.25740 | 5.91040 |
| View angle | 13.6883 | 7.0284 | 3.9954 |

TABLE 29-continued (Various data in a close-object in-focus condition)

| Image height | 10.8150 | 10.8150 | 10.8150 |
|---|---|---|---|
| Overall length of lens system | 117.57 | 117.57 | 117.57 |
| BF | 16.96 | 16.96 | 16.96 |
| d5 | 1.0000 | 16.8400 | 28.1023 |
| d8 | 3.3849 | 3.3849 | 4.1912 |
| d10 | 31.1055 | 15.2655 | 3.1969 |
| d19 | 8.3176 | 10.6904 | 9.8519 |
| d26 | 8.4470 | 6.0742 | 6.9128 |

Zoom lens unit data

| Lens unit | Initial surface No. | Focal length |
|---|---|---|
| 1 | 1 | 67.86546 |
| 2 | 6 | −46.99459 |
| 3 | 9 | −46.94255 |
| 4 | 11 | 25.09520 |
| 5 | 20 | −16.73602 |
| 6 | 27 | 75.47658 |

TABLE 30

(Wobbling values)

| | Second lens unit | Third lens unit | Fifth lens unit |
|---|---|---|---|
| W | −0.074 | −0.003 | −0.011 |
| Sb | −0.427 | 1.179 | −5.164 |
| e | −31.936 | −31.936 | −31.936 |
| $\beta_{WO}$ | −3.418 | 0.181 | 3.341 |
| $f_{WO}$ | −46.994 | −46.943 | −16.736 |
| $\beta_R$ | −0.200 | −1.104 | 0.713 |
| $f_R$ | 38.998 | 28.520 | 75.477 |

The following Table 31 shows the corresponding values to the individual conditions in the zoom lens systems of each of Numerical Examples.

TABLE 31

(Values corresponding to conditions)

| | Example | | | | | |
|---|---|---|---|---|---|---|
| Condition | 1 | 2 | 3 | 4 | 5 | 6 |
| (1) $T_1/f_w$ | 0.5459 | 0.4941 | 0.8411 | 0.7806 | 0.1994 | 0.2055 |
| (2) $(T_1 + T_2)/f_w$ | 1.0091 | 0.9168 | 1.3367 | 1.2225 | 0.2659 | 0.2723 |
| $T_1$ | 9.5595 | 9.1597 | 14.7284 | 14.4714 | 9.2406 | 9.5264 |
| $T_2$ | 8.1099 | 7.8378 | 8.6779 | 8.1941 | 3.0860 | 3.0958 |
| $f_w$ | 17.5100 | 18.5399 | 17.5100 | 18.5399 | 46.3504 | 46.3493 |

The zoom lens system according to the present invention is applicable to a digital still camera, a digital video camera, a camera for a mobile telephone, a camera for a PDA (Personal Digital Assistance), a surveillance camera in a surveillance system, a Web camera, a vehicle-mounted camera or the like. In particular, the zoom lens system according to the present invention is suitable for a photographing optical system where high image quality is required like in a digital still camera system or a digital video camera system.

Also, the zoom lens system according to the present invention is applicable to, among the interchangeable lens apparatuses according to the present invention, an interchangeable lens apparatus having motorized zoom function, i.e., activating function for the zoom lens system by a motor, with which a digital video camera system is provided.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system comprising a plurality of lens units, each lens unit comprising at least one lens element, wherein
    the plurality of lens units include a plurality of movable lens units which individually move along an optical axis at the time of zooming from a wide-angle limit to a telephoto limit during image taking,
    at least two of the movable lens units are focusing lens units which move along the optical axis at the time of focusing from an infinity in-focus condition to a close-object in-focus condition in at least one zooming position from a wide-angle limit to a telephoto limit, and
    among the focusing lens units, a lens unit having the absolute value, which is not the greatest absolute value, of a wobbling value at a wide-angle limit represented by the following expression (a) is a wobbling lens unit which senses a moving direction of the focusing lens units at the time of focusing by wobbling itself in a direction along the optical axis:

$$W = 1/e + \beta_{WO}/(Sb \times f_{WO}) - 1/((\beta_R \times f_R)) \quad (a)$$

where
W is a wobbling value at a wide-angle limit (wobbling incremental magnification sensitivity),
Sb is a focus sensitivity of the wobbling lens unit represented by the following expression $$Sb = (1 - \beta_{WO}^2) \times \beta_R^2,$$

e is an exit pupil position of the entire system at a wide-angle limit,
$\beta_{WO}$ is a paraxial lateral magnification of the wobbling lens unit at a wide-angle limit in an infinity in-focus condition,
$f_{WO}$ is a focal length of the wobbling lens unit at a wide-angle limit in an infinity in-focus condition,
$\beta_R$ is a paraxial lateral magnification of a system on the image side relative to the wobbling lens unit at a wide-angle limit in an infinity in-focus condition, and
$f_R$ is a focal length of a system on the image side relative to the wobbling lens unit at a wide-angle limit in an infinity in-focus condition.

2. The zoom lens system as claimed in claim 1, wherein a lens unit located closest to the object side is fixed relative to an image surface at the time of zooming from a wide-angle limit to a telephoto limit during image taking.

3. The zoom lens system as claimed in claim 1, wherein a lens unit having an aperture diaphragm is fixed relative to the image surface at the time of zooming from a wide-angle limit to a telephoto limit during image taking.

4. The zoom lens system as claimed in claim 1, wherein a lens unit located closest to the image side is fixed relative to the image surface at the time of zooming from a wide-angle limit to a telephoto limit during image taking.

5. The zoom lens system as claimed in claim 1, wherein the lens unit located closest to the object side has positive optical power.

6. The zoom lens system as claimed in claim 1, wherein at the time of focusing from an infinity in-focus condition to a close-object in-focus condition in the same zooming position from a wide-angle limit to a telephoto limit during image taking, the ratio of an amount of movement of a focusing lens unit α, which is one of the focusing lens units, to an amount of movement of a focusing lens unit β, which is one of the focusing lens units and is different from the focusing lens unit α, is constant regardless of the object distance.

7. The zoom lens system as claimed in claim 1, wherein an aperture diaphragm is either included in a lens unit which is located having two air spaces toward the image side from the lens unit located closest to the object side, or located on the image side relative to the lens unit which is located having two air spaces toward the image side from the lens unit located closest to the object side.

8. The zoom lens system as claimed in claim 1, wherein the plurality of lens units include an image blur compensating lens unit which moves in a direction perpendicular to the optical axis in order to optically compensate image blur.

9. The zoom lens system as claimed in claim 1, wherein the following condition (1) is satisfied:

$$0.1 < T_1/f_W < 1.5 \qquad (1)$$

where $T_1$ is an axial thickness of the lens unit located closest to the object side, and $f_W$ is a focal length of the entire system at a wide-angle limit.

10. The zoom lens system as claimed in claim 1, wherein the following condition (2) is satisfied:

$$0.1 < (T_1+T_2)/f_W < 2.5 \qquad (2)$$

where $T_1$ is an axial thickness of the lens unit located closest to the object side, $T_2$ is an axial thickness of a lens unit which is located having one air space toward the image side from the lens unit located closest to the object side, and $f_W$ is a focal length of the entire system at a wide-angle limit.

11. An interchangeable lens apparatus comprising:

the zoom lens system as claimed in claim 1; and a lens mount section which is connectable to a camera body including an image sensor for receiving an optical image formed by the zoom lens system and converting the optical image into an electric image signal.

12. A camera system comprising:

an interchangeable lens apparatus including the zoom lens system as claimed in claim 1; and a camera body which is detachably connected to the interchangeable lens apparatus via a camera mount section, and includes an image sensor for receiving an optical image formed by the zoom lens system and converting the optical image into an electric image signal.

* * * * *